US00RE36301E

United States Patent [19]

Kai et al.

[11] E Patent Number: Re. 36,301

[45] Reissued Date of Patent: Sep. 14, 1999

[54] IMAGE FORMING APPARATUS HAVING ROTATABLE ELECTROPHOTOGRAPHIC PROCESS UNIT

[75] Inventors: Tsukuru Kai, Fujisawa; Masayuki Ohtani, Yokohama; Takaaki Yanagisawa, Yokohama; Hisashi Ishijima, Yokohama; Masaaki Nagano, Nishisonogi-gun, all of Japan

[73] Assignee: Ricoh Company, Ltd., Tokyo, Japan

[21] Appl. No.: 08/754,520

[22] Filed: Nov. 21, 1996

Related U.S. Patent Documents

Reissue of:

[64] Patent No.: 5,367,363
Issued: Nov. 22, 1994
Appl. No.: 07/800,240
Filed: Nov. 29, 1991

[30] Foreign Application Priority Data

| | | | |
|---|---|---|---|
| Nov. 30, 1990 | [JP] | Japan | 2-330686 |
| Nov. 30, 1990 | [JP] | Japan | 2-330688 |
| Nov. 30, 1990 | [JP] | Japan | 2-330689 |
| Nov. 30, 1990 | [JP] | Japan | 2-330698 |
| Apr. 30, 1991 | [JP] | Japan | 3-124553 |
| May 21, 1991 | [JP] | Japan | 3-144247 |
| May 23, 1991 | [JP] | Japan | 3-146495 |

[51] Int. Cl.[6] ..... G03G 21/18

[52] U.S. Cl. ..... 399/113; 399/12; 399/21

[58] Field of Search ..... 399/110, 111, 399/119, 123, 113, 163, 158, 258, 88, 12, 21

[56] References Cited

U.S. PATENT DOCUMENTS

| | | | |
|---|---|---|---|
| 3,809,916 | 5/1974 | Crane | 399/88 X |
| 4,540,268 | 9/1985 | Toyono et al. | 399/111 X |
| 4,757,344 | 7/1988 | Idenawa et al. | 399/113 |
| 5,051,778 | 9/1991 | Watanabe et al. | 399/111 X |
| 5,061,959 | 10/1991 | Kinoshita et al. | 399/113 |
| 5,119,133 | 6/1992 | Swain | 399/163 |
| 5,172,164 | 12/1992 | Fujiwara et al. | 399/158 X |
| 5,182,601 | 1/1993 | Hodoshima et al. | 399/258 |
| 5,196,884 | 3/1993 | Sugiyama et al. | 399/110 |
| 5,258,819 | 11/1993 | Kimura et al. | 399/119 |

FOREIGN PATENT DOCUMENTS

| | | |
|---|---|---|
| 3941506 | 6/1990 | Germany . |
| 2-250066 | 10/1990 | Japan . |

*Primary Examiner*—S. Lee
*Attorney, Agent, or Firm*—Oblon, Spivak, McClelland, Maier & Neustadt, P.C.

[57] ABSTRACT

An image forming apparatus has two units which are engageable with a photoconductive element and provided with a substantially identical configuration. Various electrophotographic process devices including a developing device and a cleaning device and to be arranged around the photoconductive element are selectively arranged in the two units. The photoconductive element is passed over two rollers such that part of the element forms parallel flat portions. The two units and the photoconductive element are rotatable integrally with each other.

51 Claims, 35 Drawing Sheets

IMAGE FORMING APPARATUS HAVING ROTATABLE ELECTROPHOTOGRAPHIC PROCESS UNIT

Matter enclosed in heavy brackets [ ] appears in the original patent but forms no part of this reissue specification; matter printed in italics indicates the additions made by reissue.

BACKGROUND OF THE INVENTION

The present invention relates to a copier or similar image forming apparatus of the type forming a desired image on a recording sheet by electrophotographic process devices which are implemented as units.

A conventional image forming apparatus, e.g., a copier has a main charger, developing device, transfer charger cleaning device and other process devices arranged around a rotatable photoconductive element Such process devices are sequentially arranged in a particular order and mounted on the framework or similar structural member of the copier body with consideration given to their intervals. Today, while the process devices of a copier are increasing in number and in size to meet the demand for versatile functions, there is an increasing demand for a miniature copier. These contradictory demands make the internal layout of the copier complicated. A copier needs daily maintenance associated with the operation of the copier, e.g., the supply of fresh toner and the discharge of waste toner. Also, when the copier stops operating due to an error such as a paper jam on a transport path or the contamination or deterioration of some process device, the copier has to be inspected and repaired. Such maintenance, as well as periodic inspection, is usually performed by dividing and opening part of interest of the copier. This kind of implementation, however, is not always feasible when it comes to the maintenance and inspection of the individual process units, although desirable for the removal of a jamming sheet. In light of this, the photoconductive element and various process devices may be integrally supported by a process unit, as disclosed in Japanese Patent Laid-Open Publication No. 140264/1985, for example. The process unit is removably mounted on the copier body, and the photoconductive element and process units are each movable relative to the others.

A problem with the conventional process unit scheme is that the process unit cannot be readily inserted into or pulled out from the copier body since the mounting position within the copier body is fixed. The fixed mounting position brings about another problem that in the event of maintenance or inspection the toner deposited on, for example, the process devices is apt to smear the person's body and cloths and/or the person is apt to touch and damage the photoconductive element by accident. Moreover, even the routine work such as the supply of fresh toner cannot be done without calling for a serviceman with expert knowledge since it involves the disassembly of part of the copier body. In addition, when the copier is left unoperated over a long period of time, the photoconductive element and the process units have their contacting portions deteriorated due to the pressure continuously acting thereon and/or the toner is solidified at the contacting portions. Then, when the copier is started to operate again, a stripe pattern or similar defect appears on reproductions.

SUMMARY OF THE INVENTION

It is, therefore, an object of the present invention to provide an image forming apparatus which insures extremely easy and sure daily maintenance including toner supply without smearing the operator's cloths or damaging process units.

It is another object of the present invention to provide an image forming apparatus which substantially frees the operator from smears or prevents the operator from inadvertently damaging a photoconductive element in the event of maintenance.

It is another object of the present invention to provide an image forming apparatus which prevents the operator from accidentally damaging a photoconductive element and frees the operator from smears in the event of removal of a jamming sheet.

It is another object of the present invention to provide an image forming apparatus which allows each process device to be surely mounted in the event of replacement and, after the process device has been mounted, automatically cleans a photoconductive element to remove smears therefrom.

An image forming apparatus of the present invention comprises an image carrier, and a plurality of electrophotographic process devices. At least part of the plurality of electrophotographic process devices are constructed into two units each being engageable with the image carrier and rotatable integrally with the image carrier.

BRIEF DESCRIPTION OF THE DRAWINGS

The above and other objects, features and advantages of the present invention will become more apparent from the following detailed description taken with the accompanying drawings in which.

Figure 12:
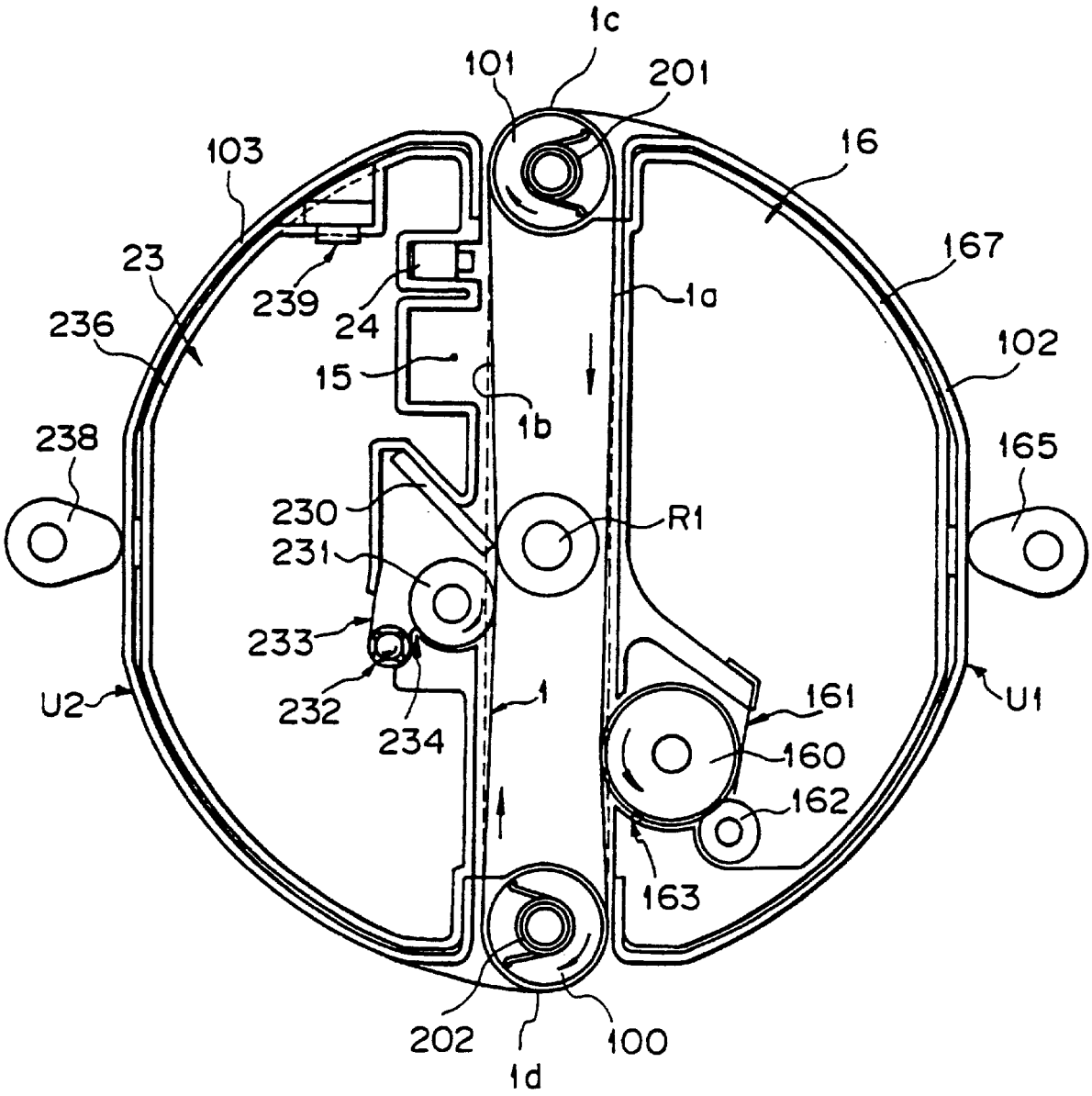
FIG. 12 is a front view showing a third embodiment of the present invention in a locked condition.
Figure 14:
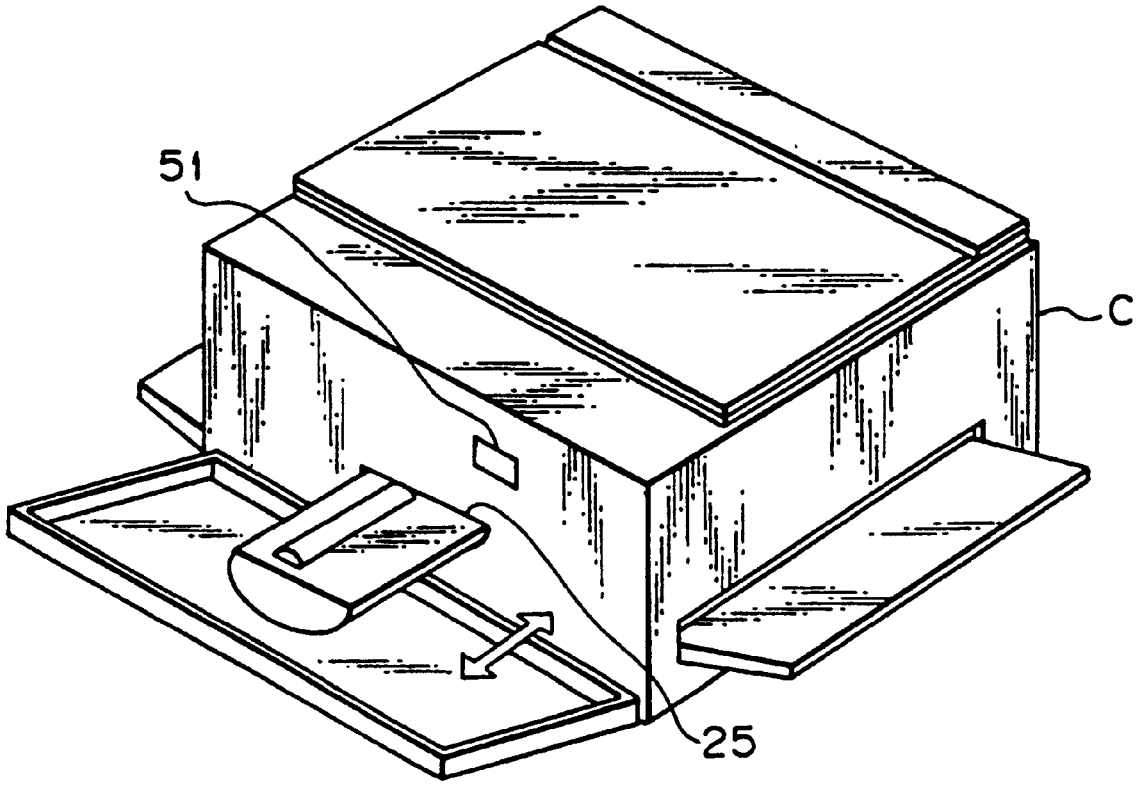
Figure 15A:
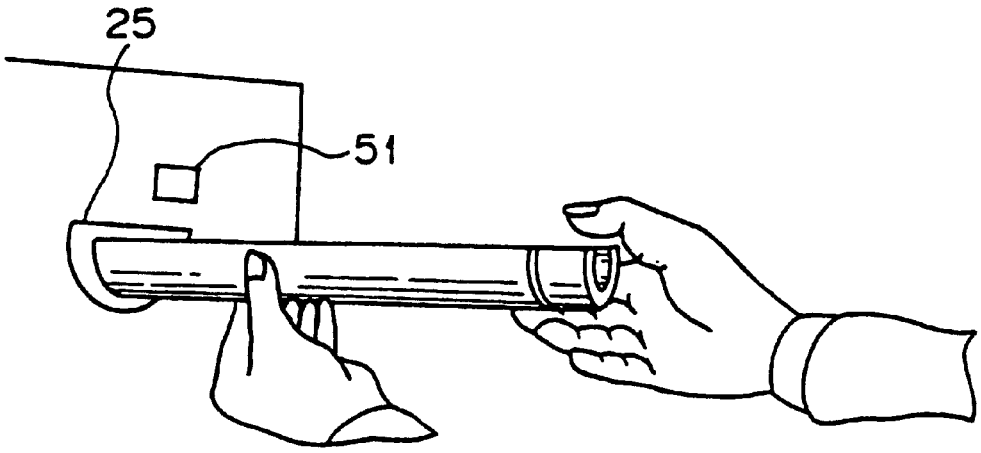
Figure 15B:
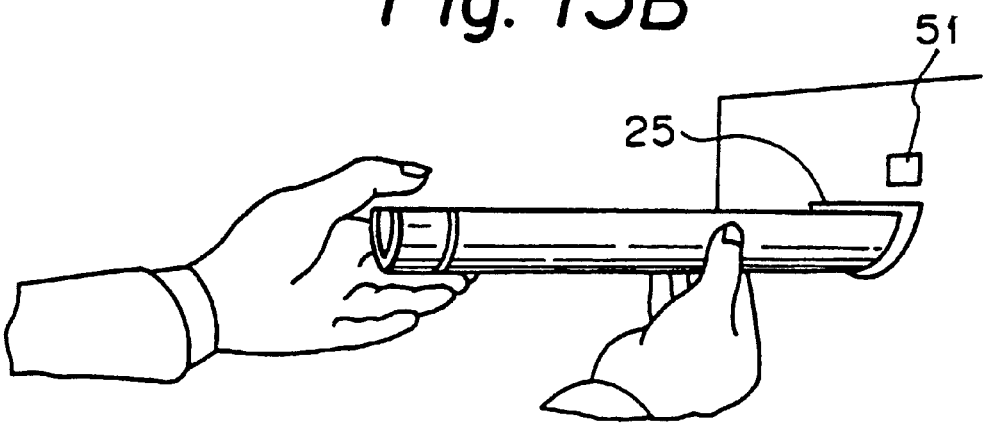
Figure 16A:
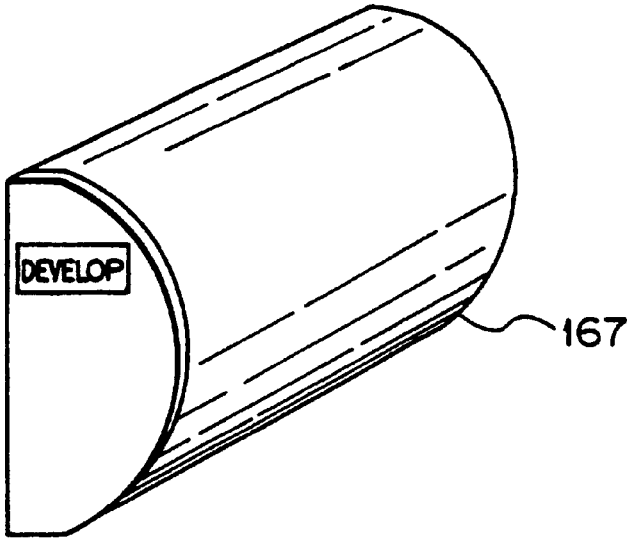
Figure 16B:
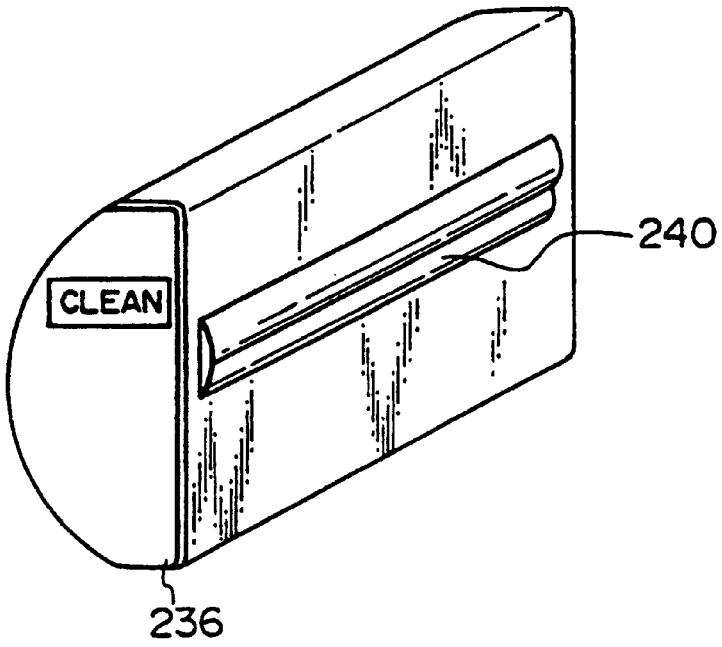
Figure 17:
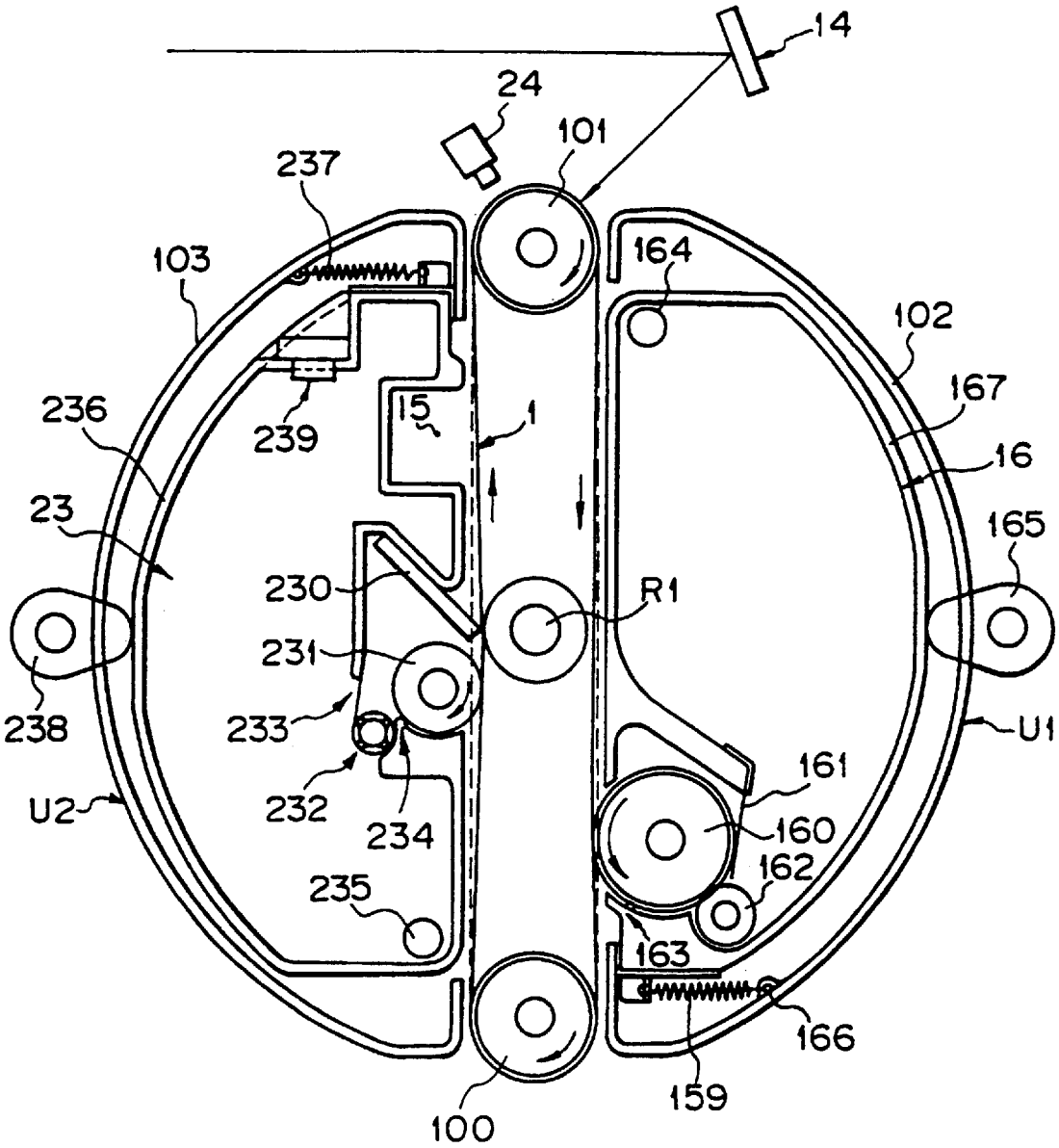
Figure 18:
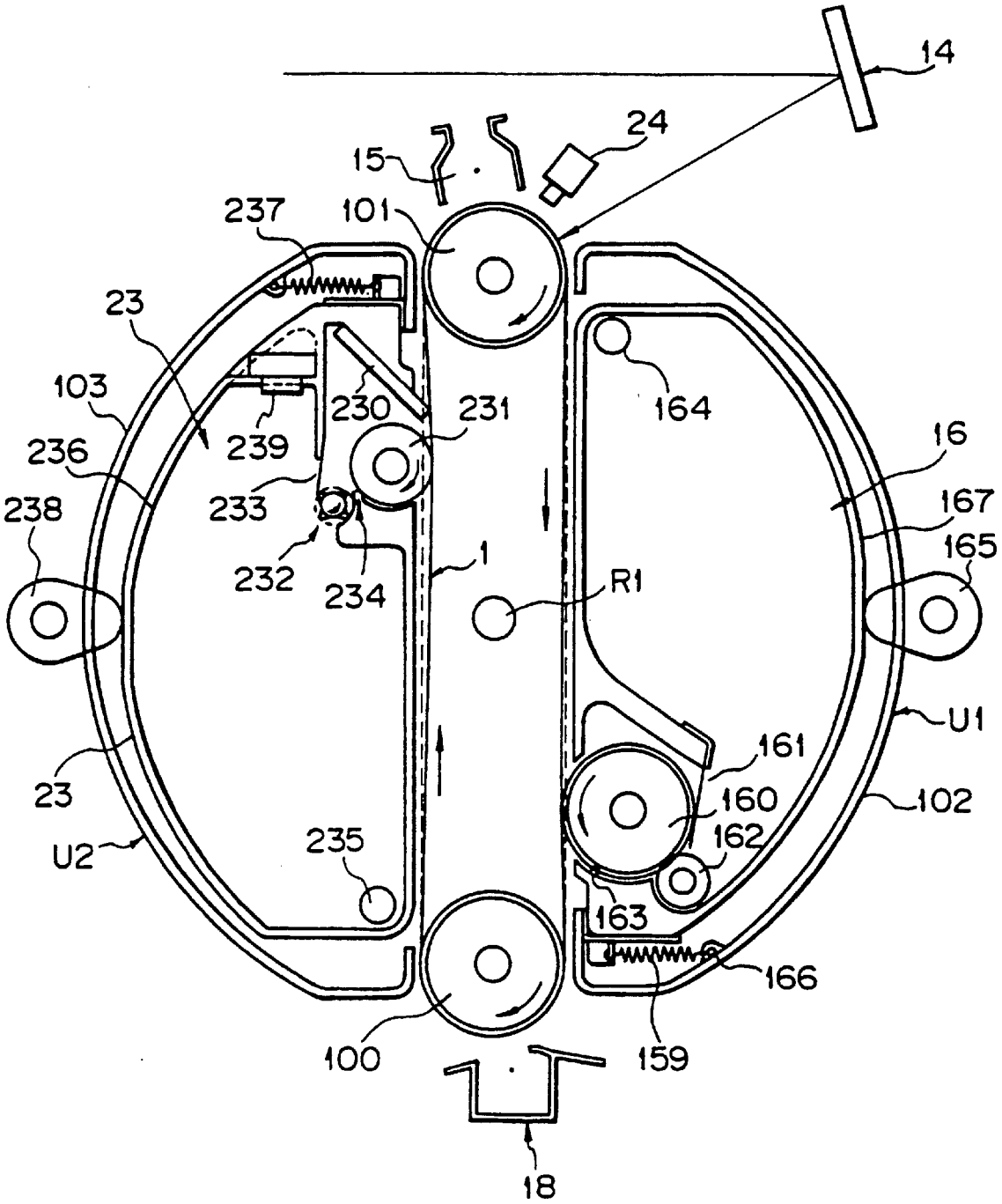
Figure 19A:
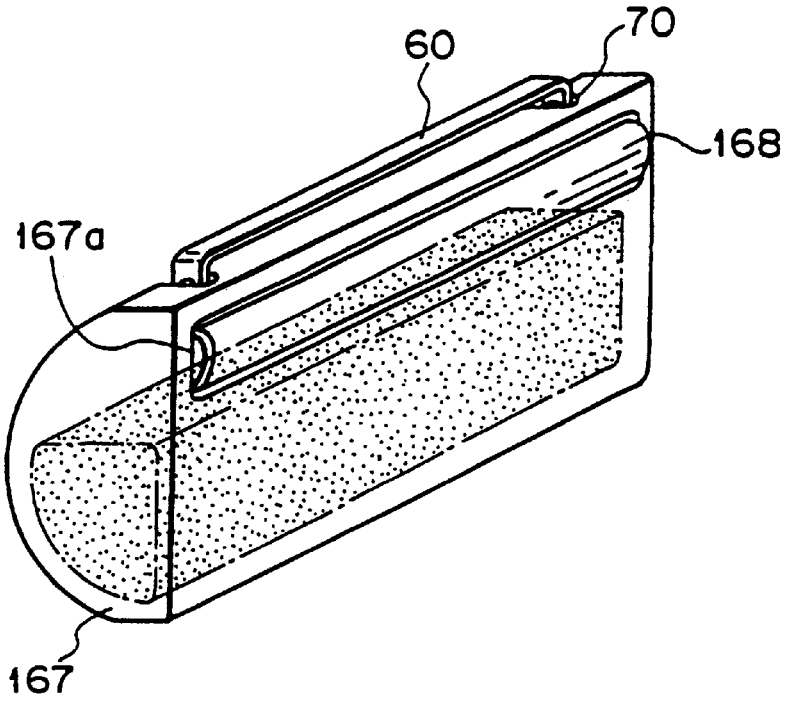
Figure 19B:
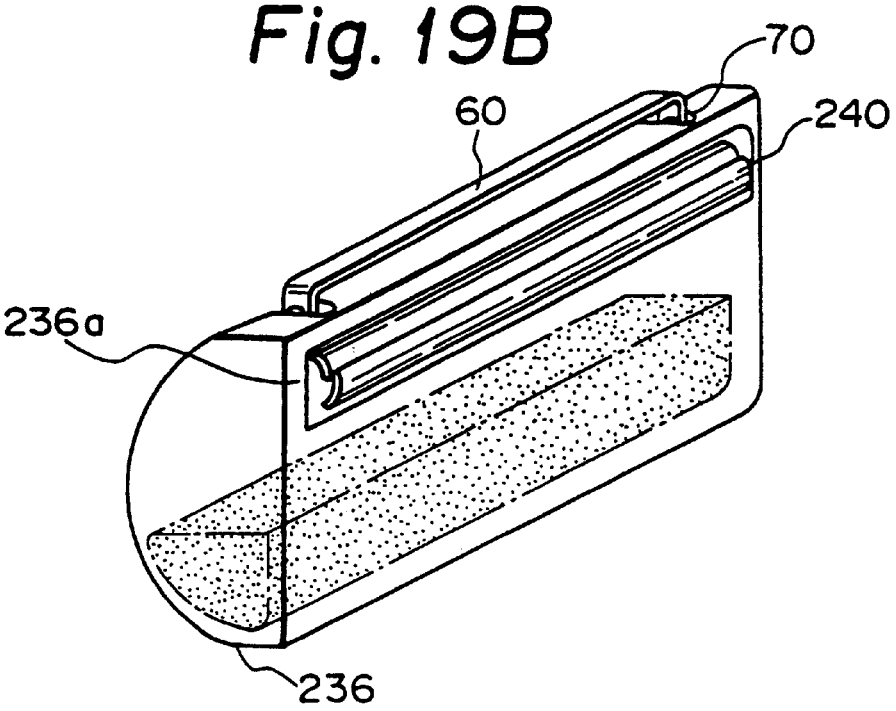
Figure 20A:
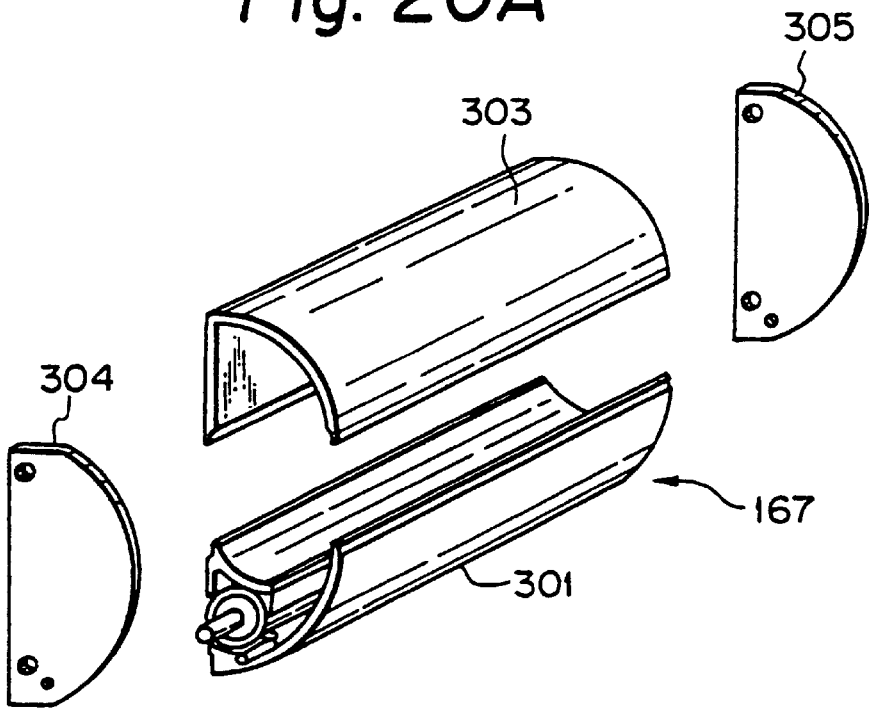
Figure 20B:
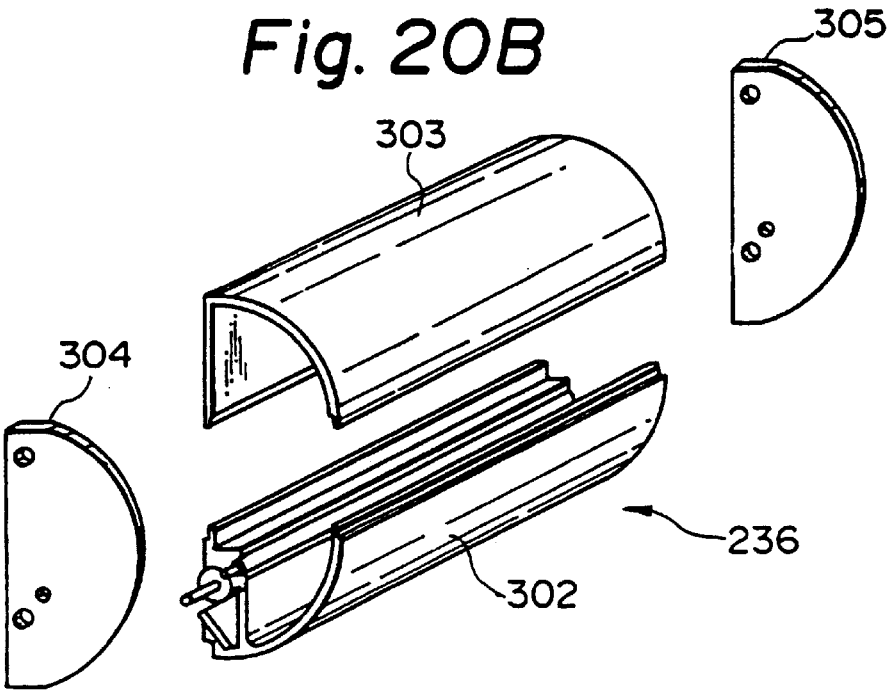
Figure 21:
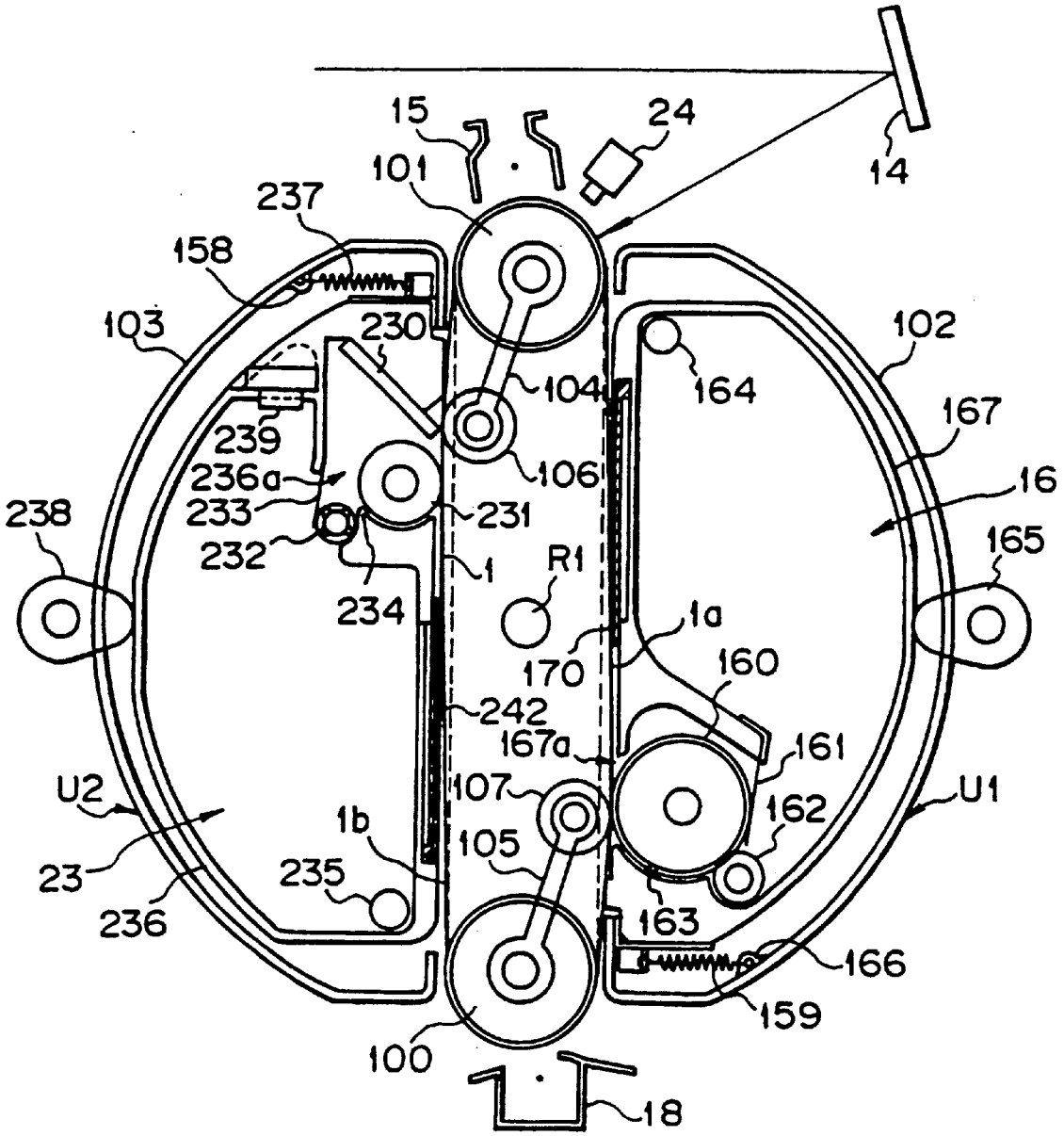
Figure 22:
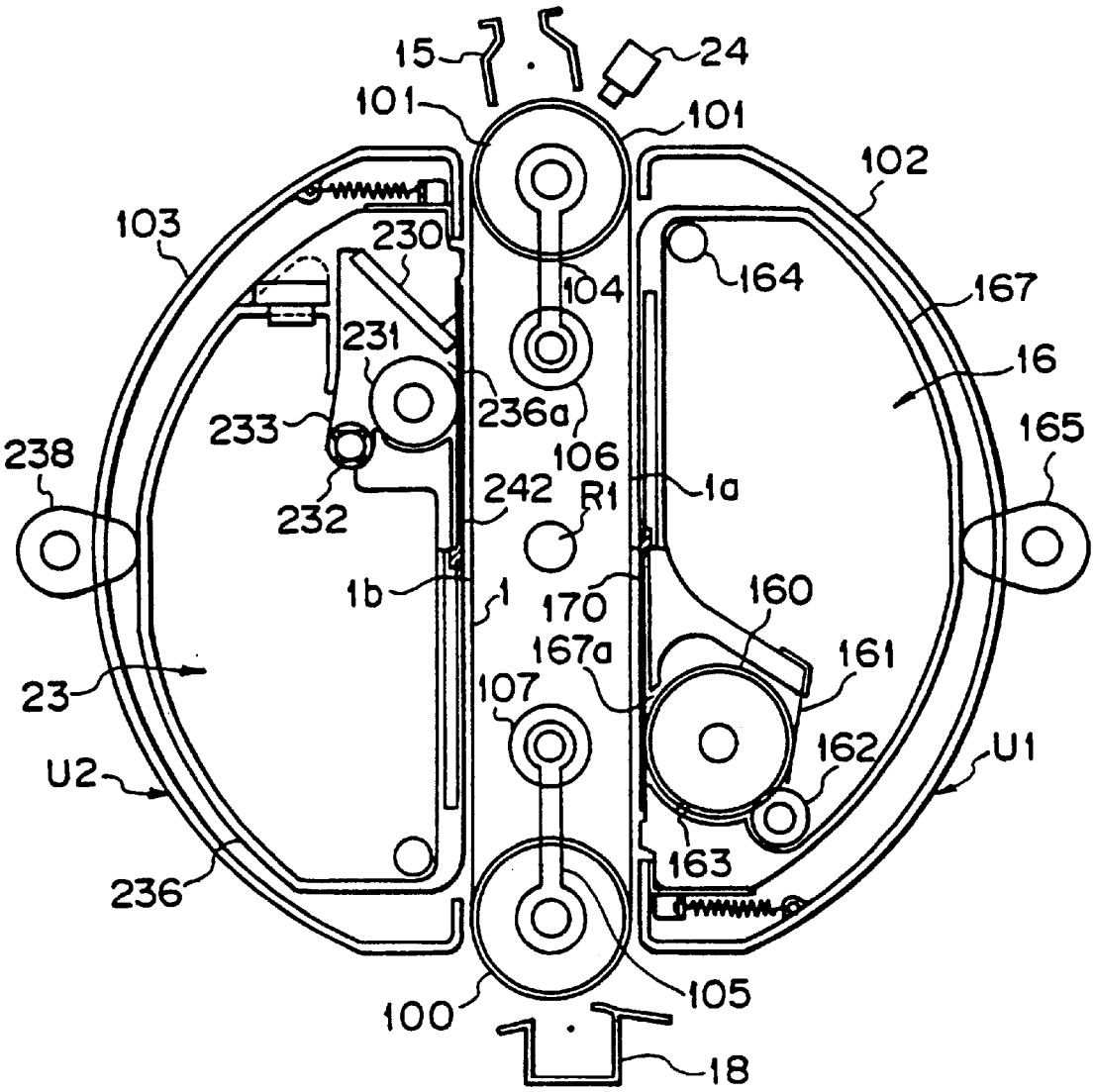
Figure 23:
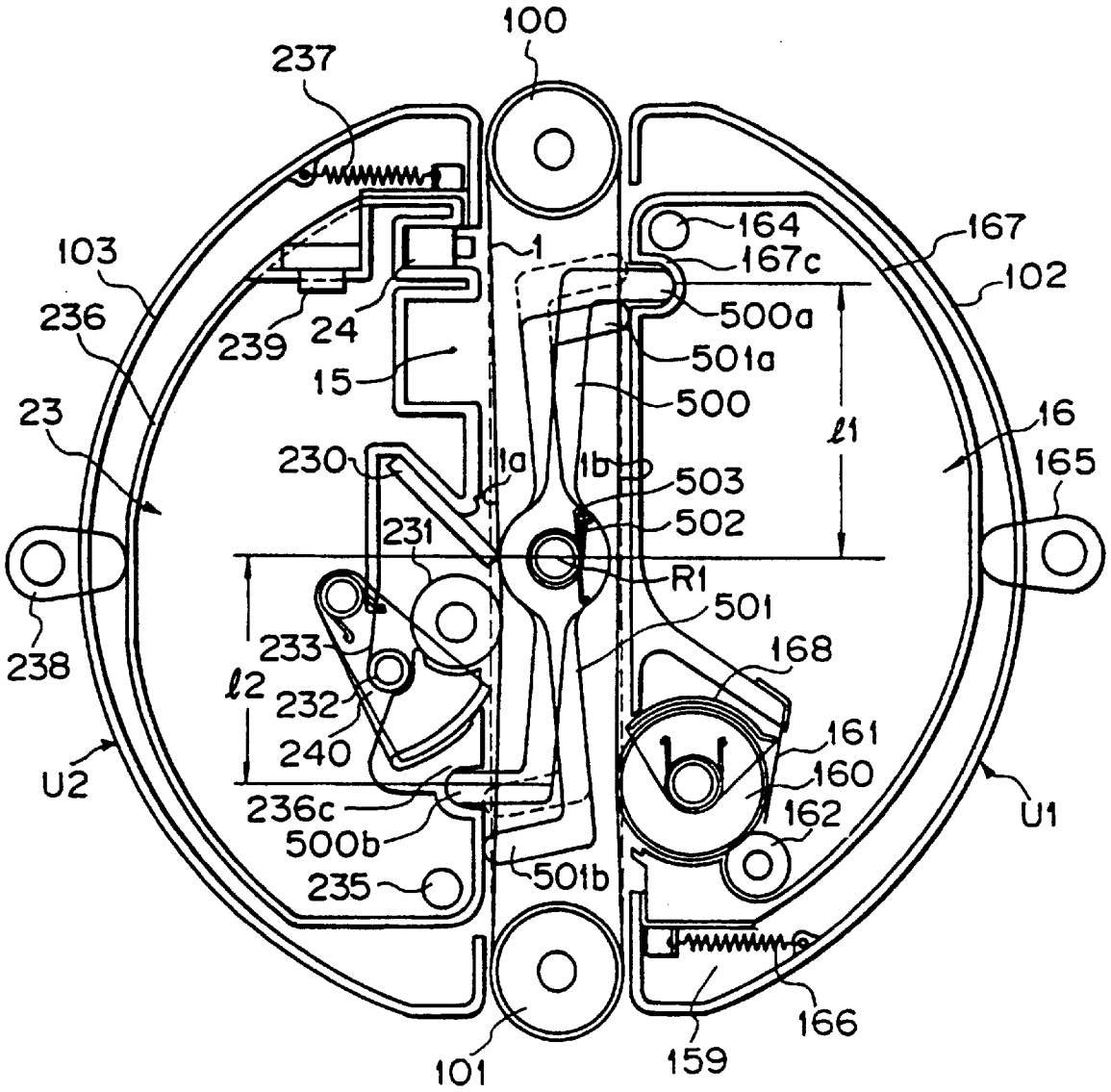
Figure 24:
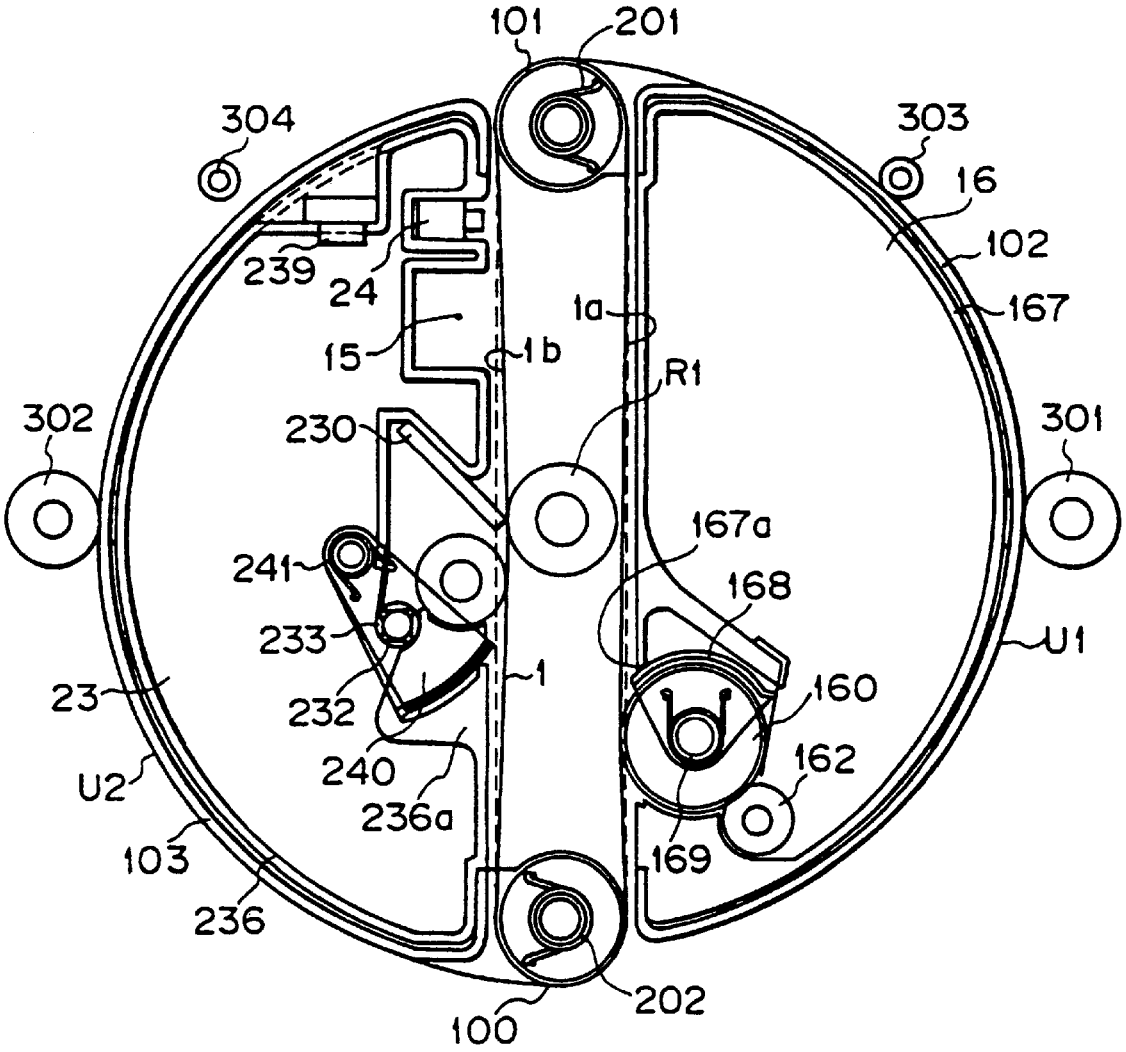
Figure 25:
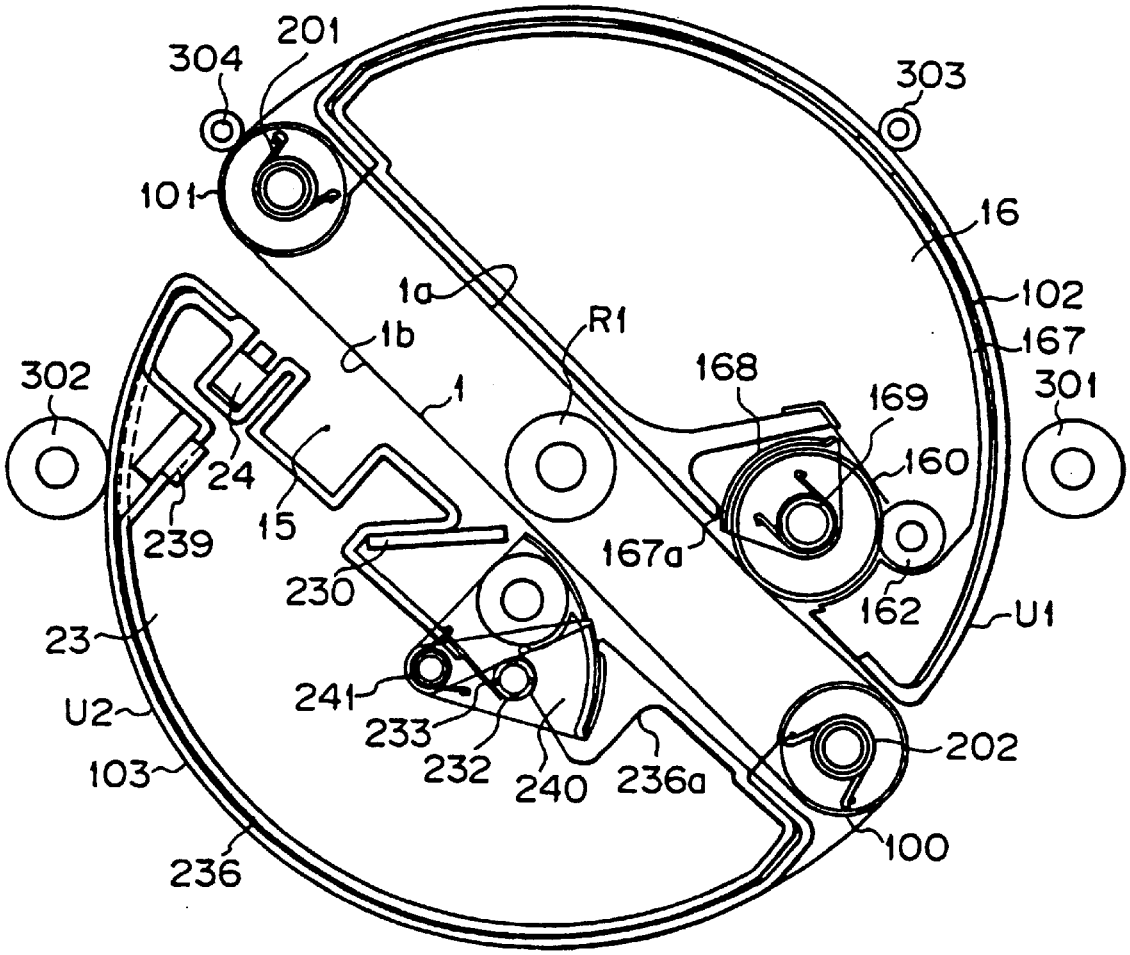
Figure 26:
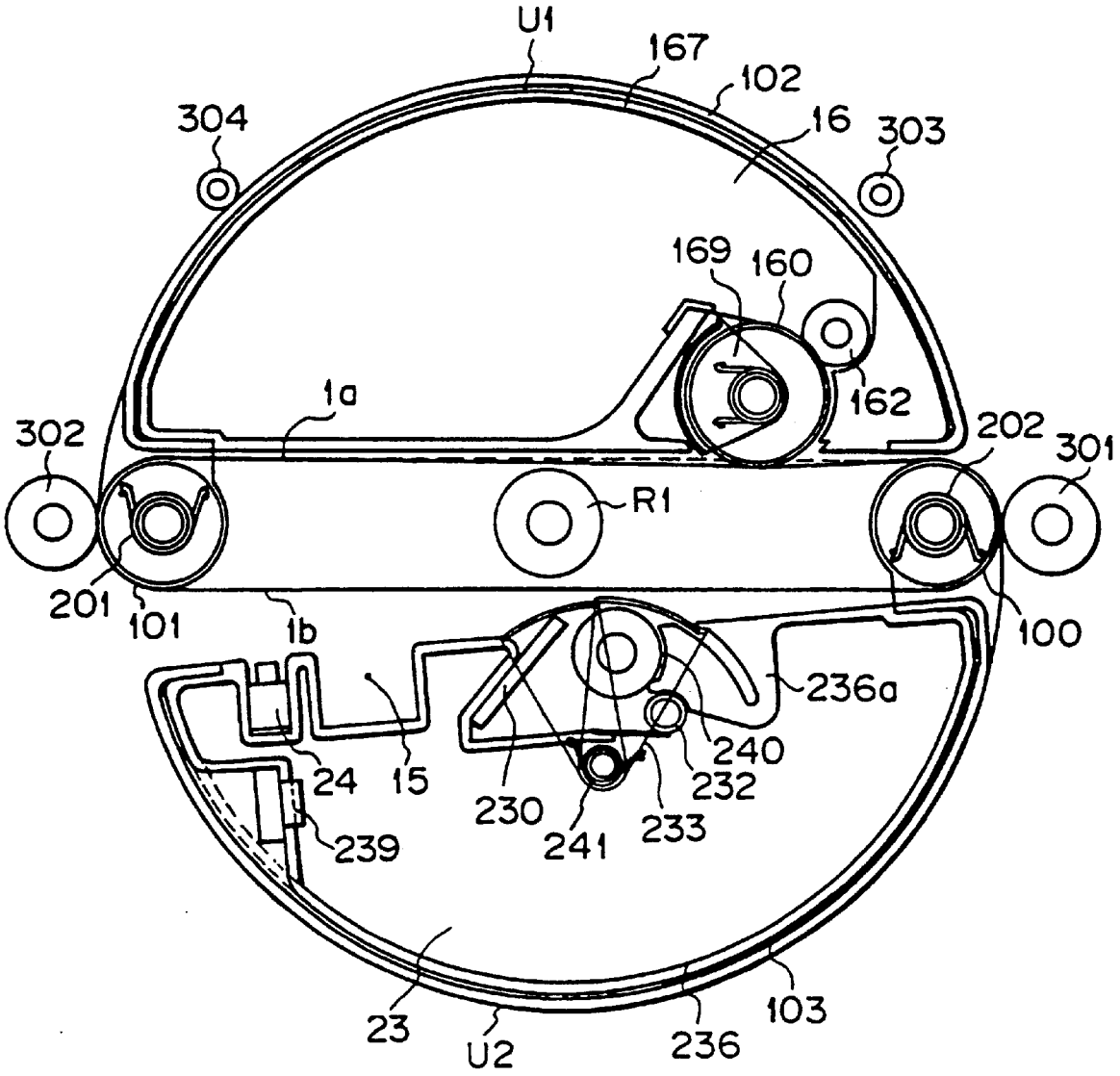
Figure 27:
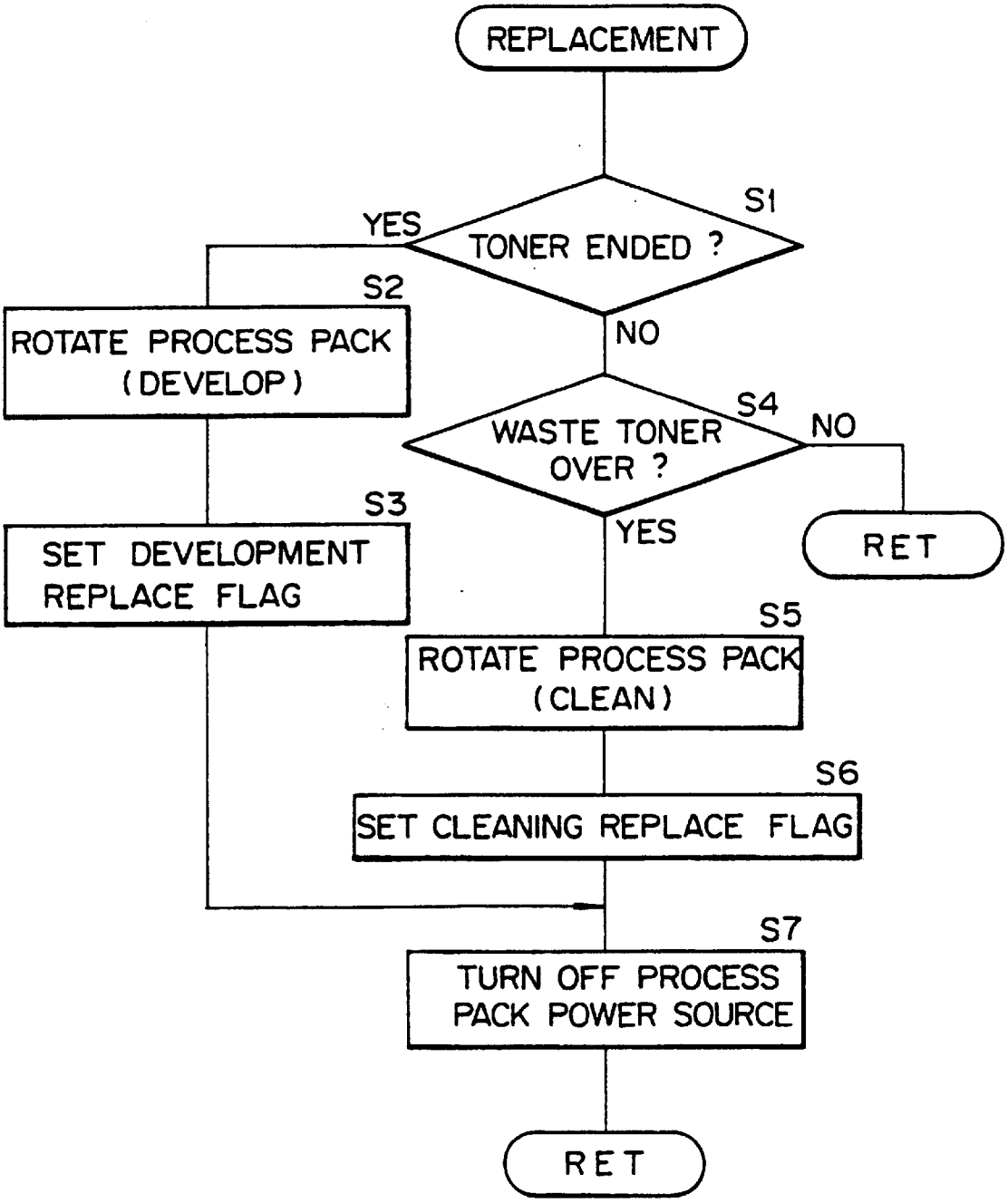
Figure 28:
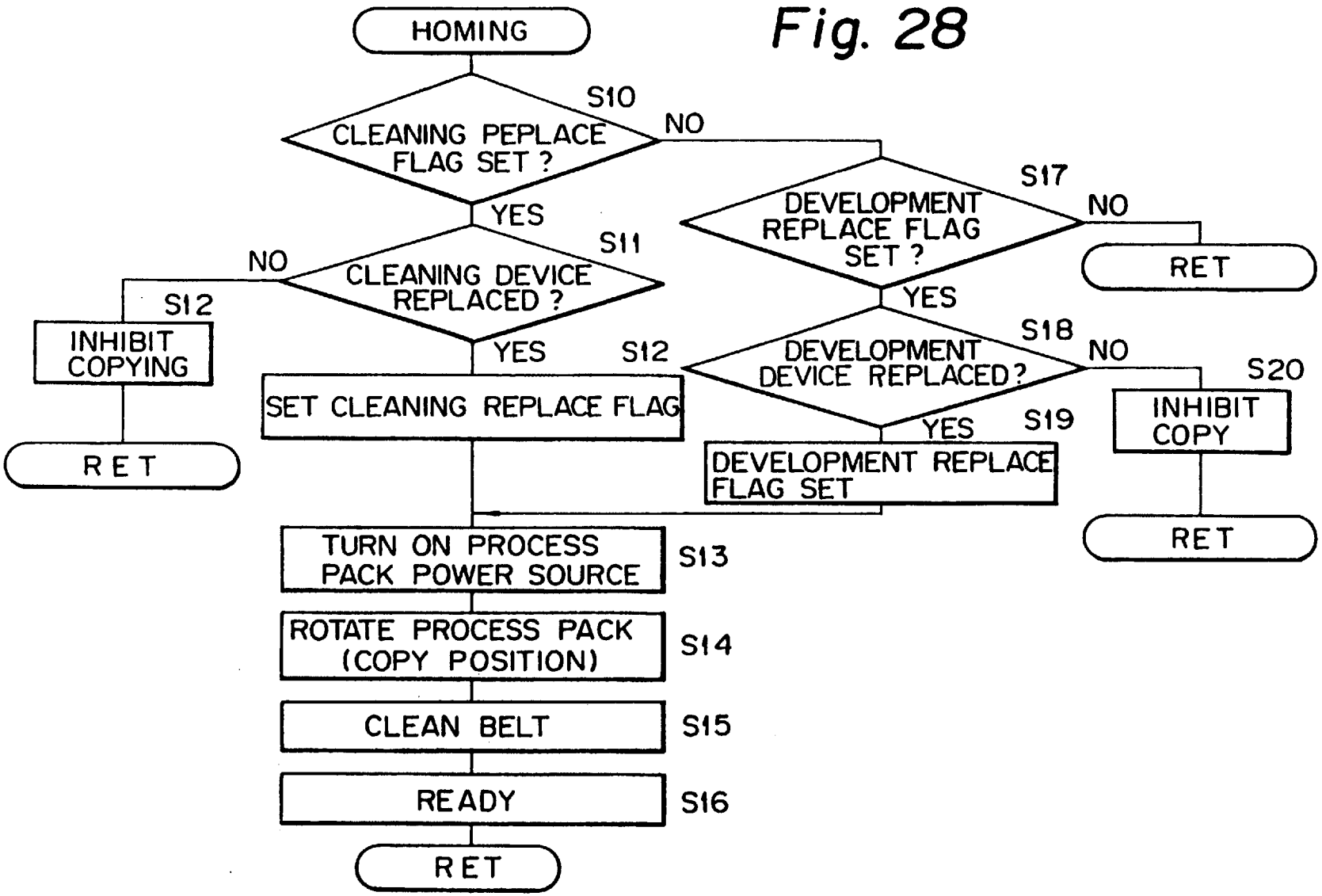
Figure 30:
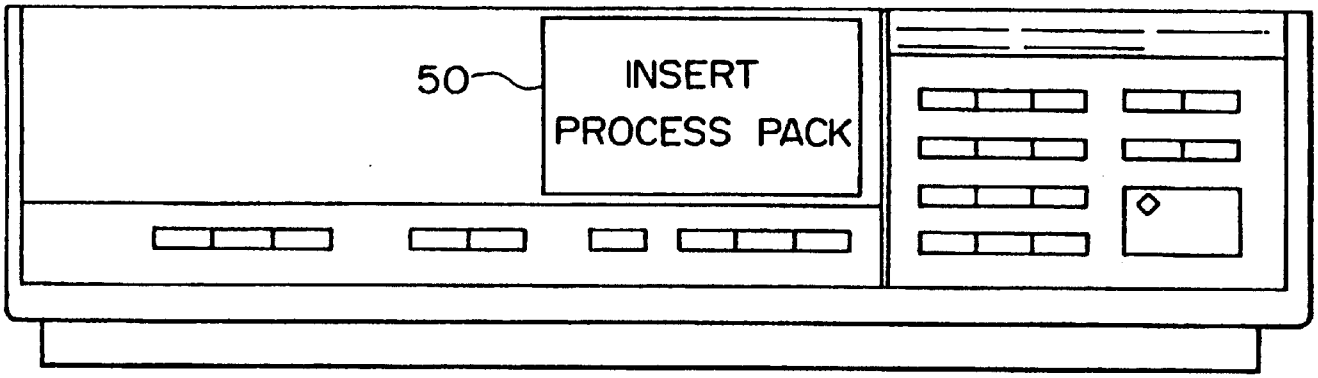
Figure 31:
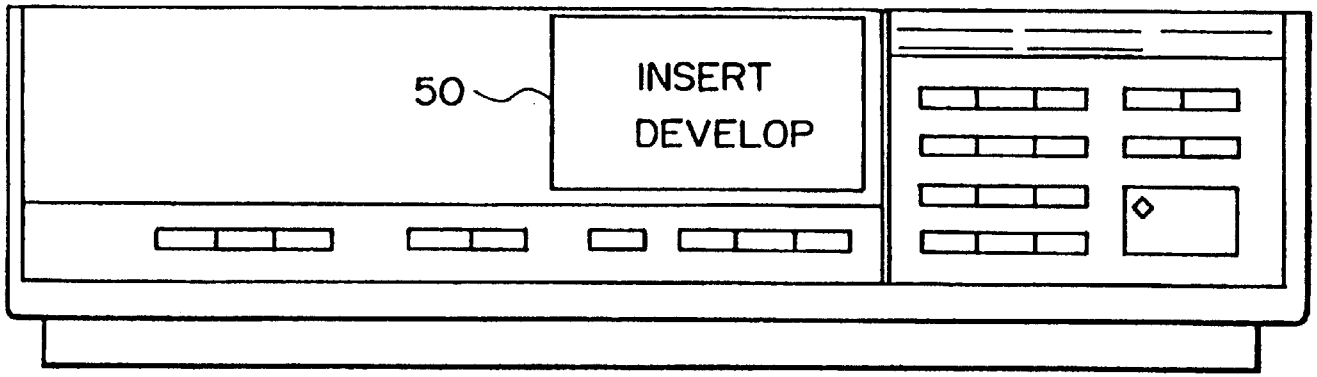
Figure 32A:
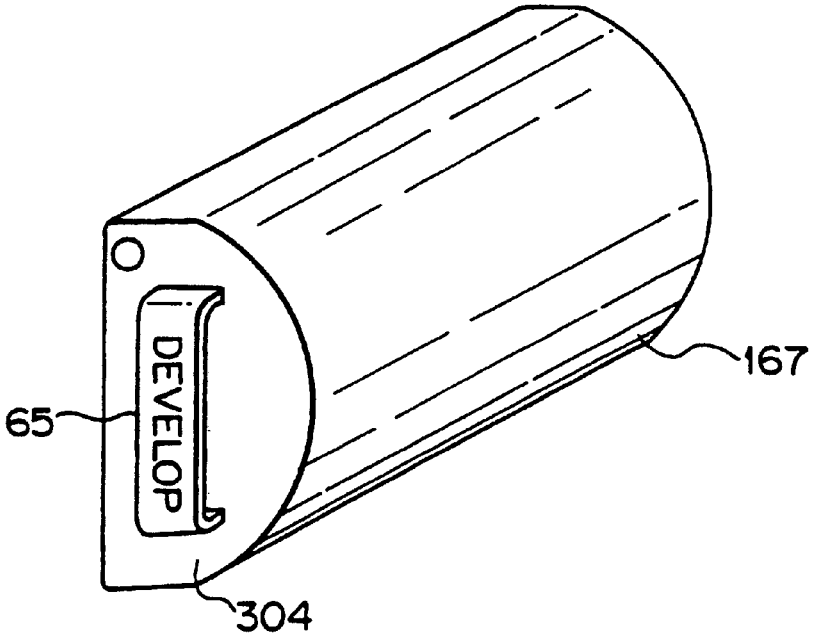
Figure 32B:
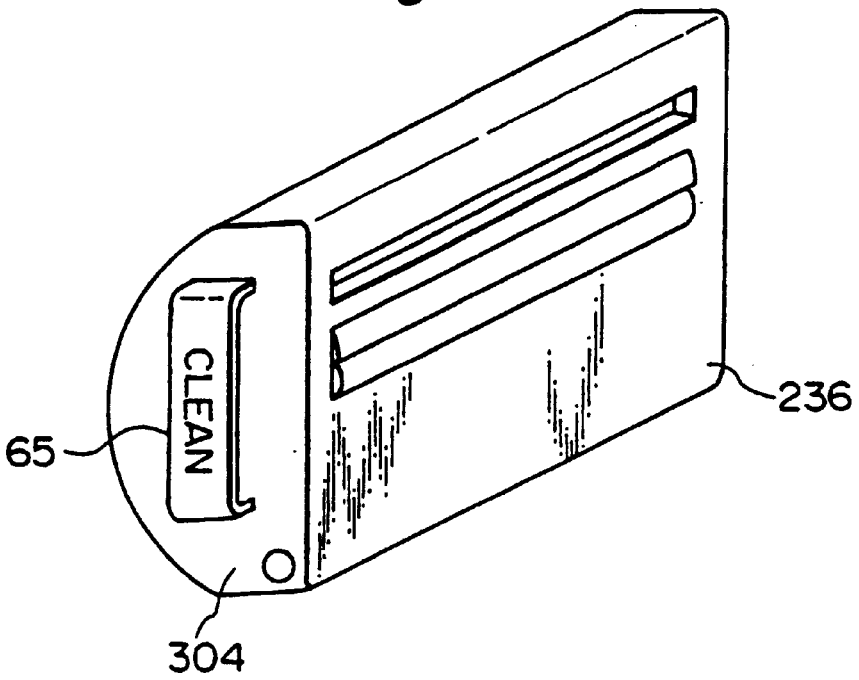
Figure 33:
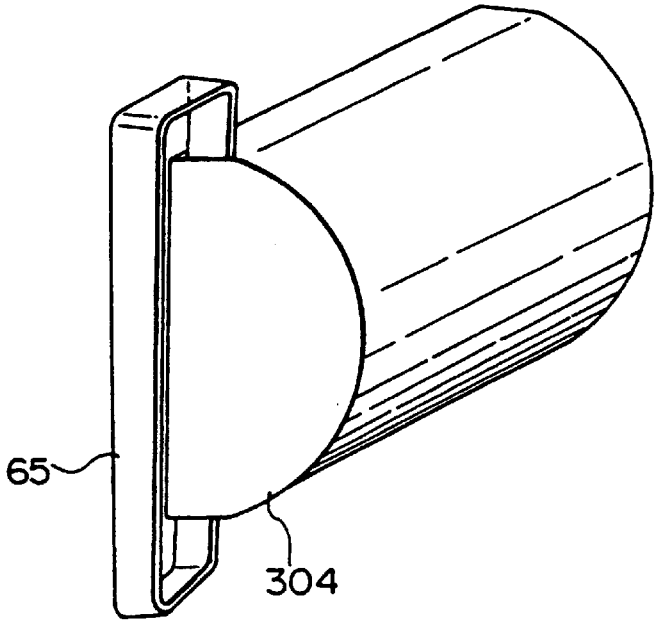
Figure 34A:
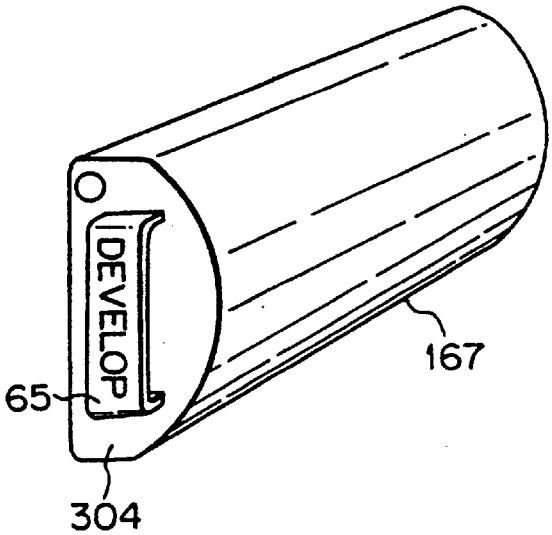
Figure 34B:
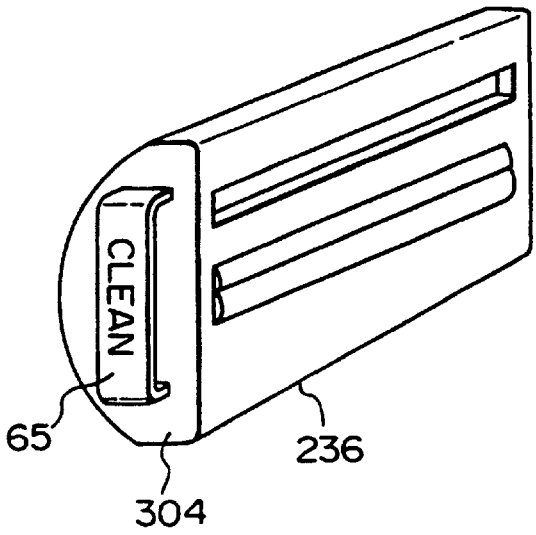

FIG, 13 is a view similar to FIG. 12, showing the embodiment in an unlocked condition;

FIG. 14 is a perspective view of the third embodiment;

FIGS. 15A and 15B each shows a specific manner in which a process pack included in the third embodiment is inserted into or pulled out from the copier body;

FIGS. 16A and 16B are perspective views each showing a particular process pack included in the third embodiment and having been pulled out from the copier body;

FIG. 17 is a front view showing a fourth embodiment of the present invention in a locked condition;

FIG. 18 is a front view of a fifth embodiment in a locked condition;

FIGS. 19A and 19B are perspective views each showing a particular process pack included in the fifth embodiment and having been removed from the copier body;

FIGS. 20A and 20B are exploded perspective views each showing the process pack in assembly;

FIG. 21 is a front view of a sixth embodiment of the present invention in an image forming condition;

FIG. 22 is a front view of the sixth embodiment in a standby condition;

FIG. 23 is a front view of a seventh embodiment of the present invention in a locked condition;

FIGS. 24, 25, and 26 are front views each showing an eighth embodiment of the present invention in a particular condition;

FIGS. 27 and 28 are flowcharts demonstrating a specific cleaning operation to be executed by the embodiments;

FIGS. 29A, 29B, 29C, and 29E are fragmentary views each showing essential part of a conduction sensor included in any of the embodiments;

FIGS. 30 and 31 each shows a specific message appearing on an operation and display section;

FIGS. 32A and 32B are perspective views each showing a process pack pulled out of the copier body;

FIG. 33 is a respective view also showing a process pack pulled out of the copier body;

FIGS. 34A and 34B are perspective views each showing a process pack removed from the copier body.

Figure 35:
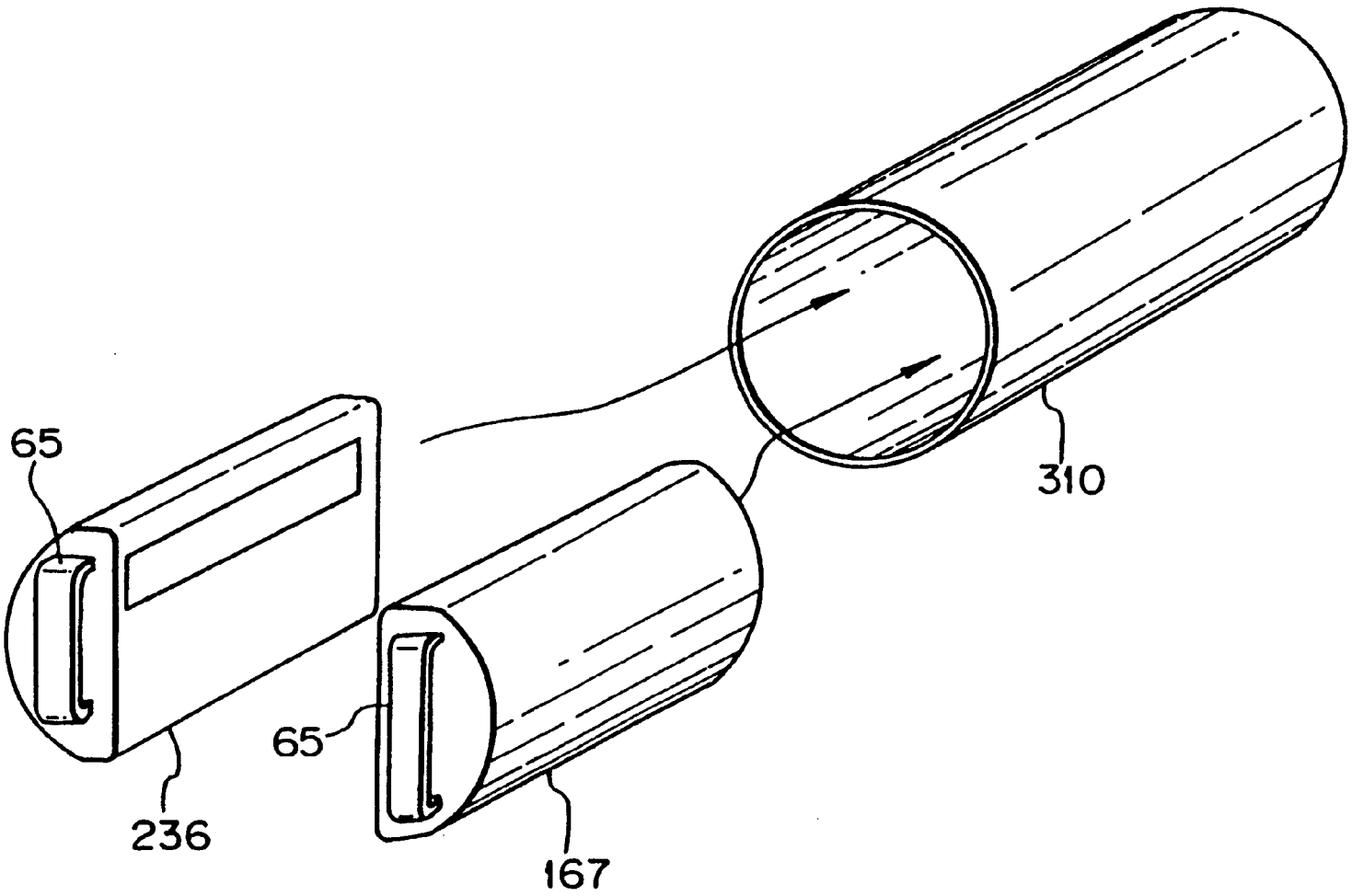
Figure 36:
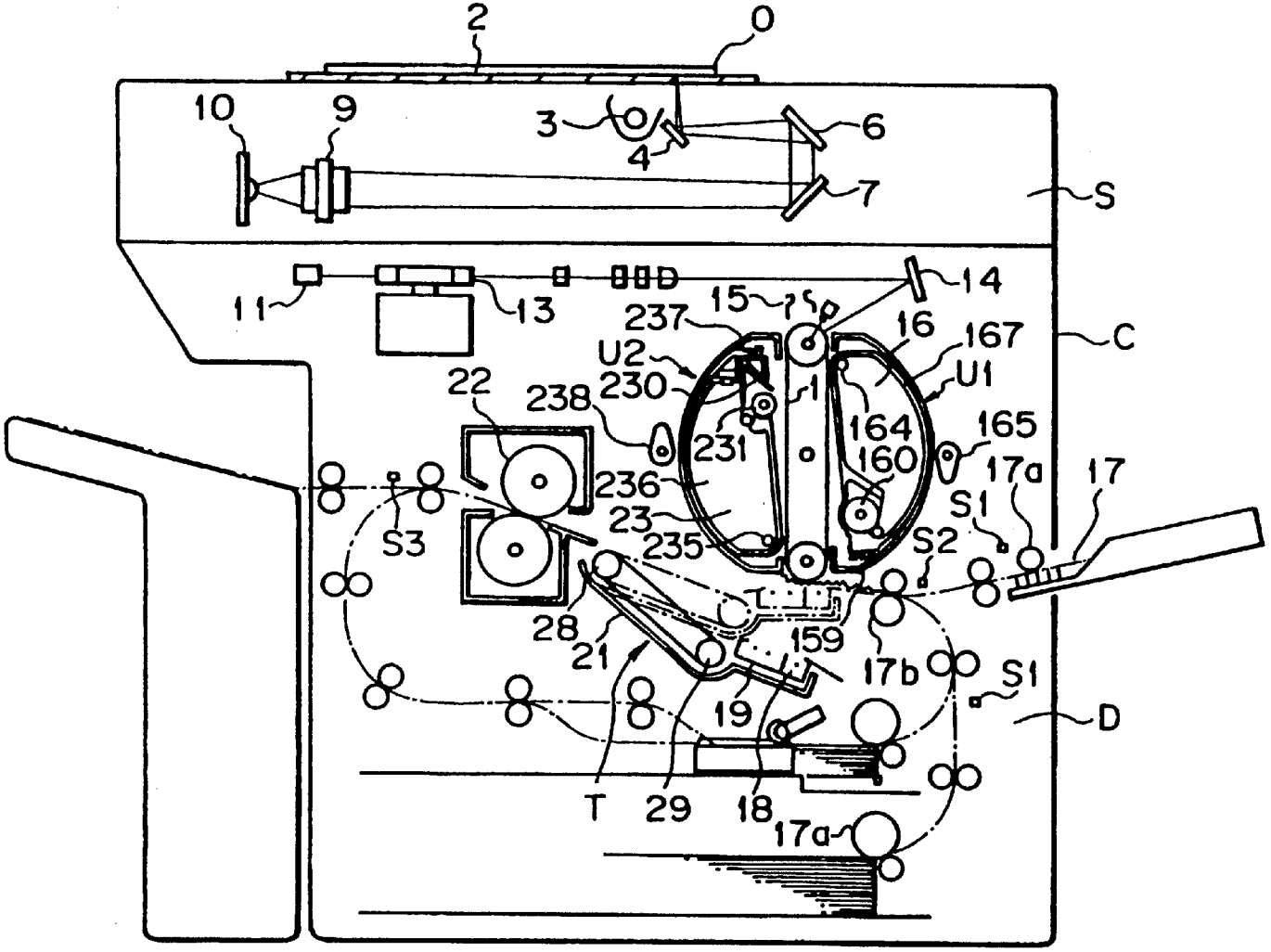
Figure 37:
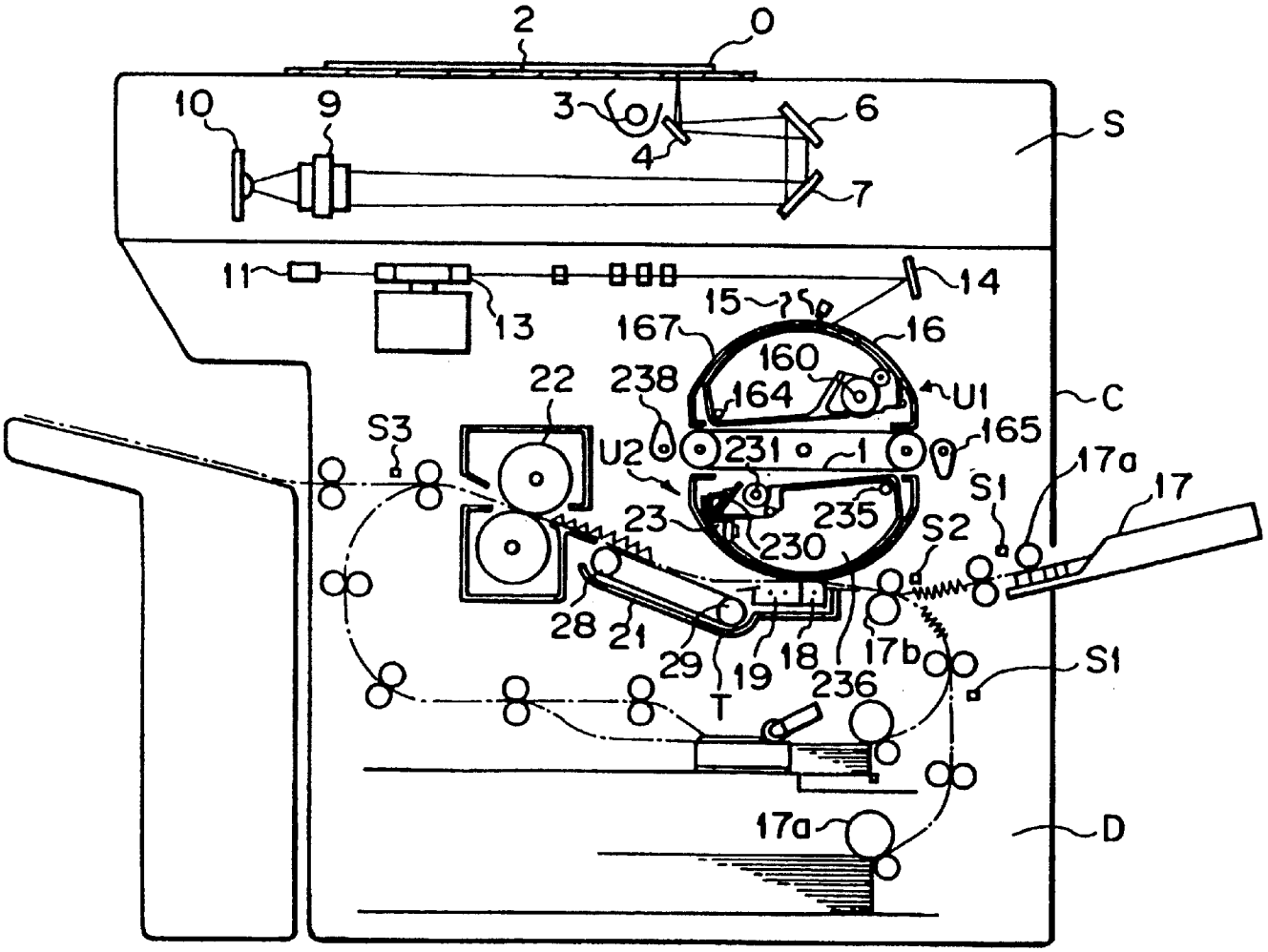

FIG. 35 shows a specific manner in which process packs may be stored in a receptacle;

FIG. 36 shows a specific condition in which a recording sheet has jammed a transport path at an image transfer station; and FIG. 37 shows another specific condition ill which a recording sheet has jammed the transport path at another position.

DESCRIPTION OF THE PREFERRED EMBODIMENTS

Figure 1:
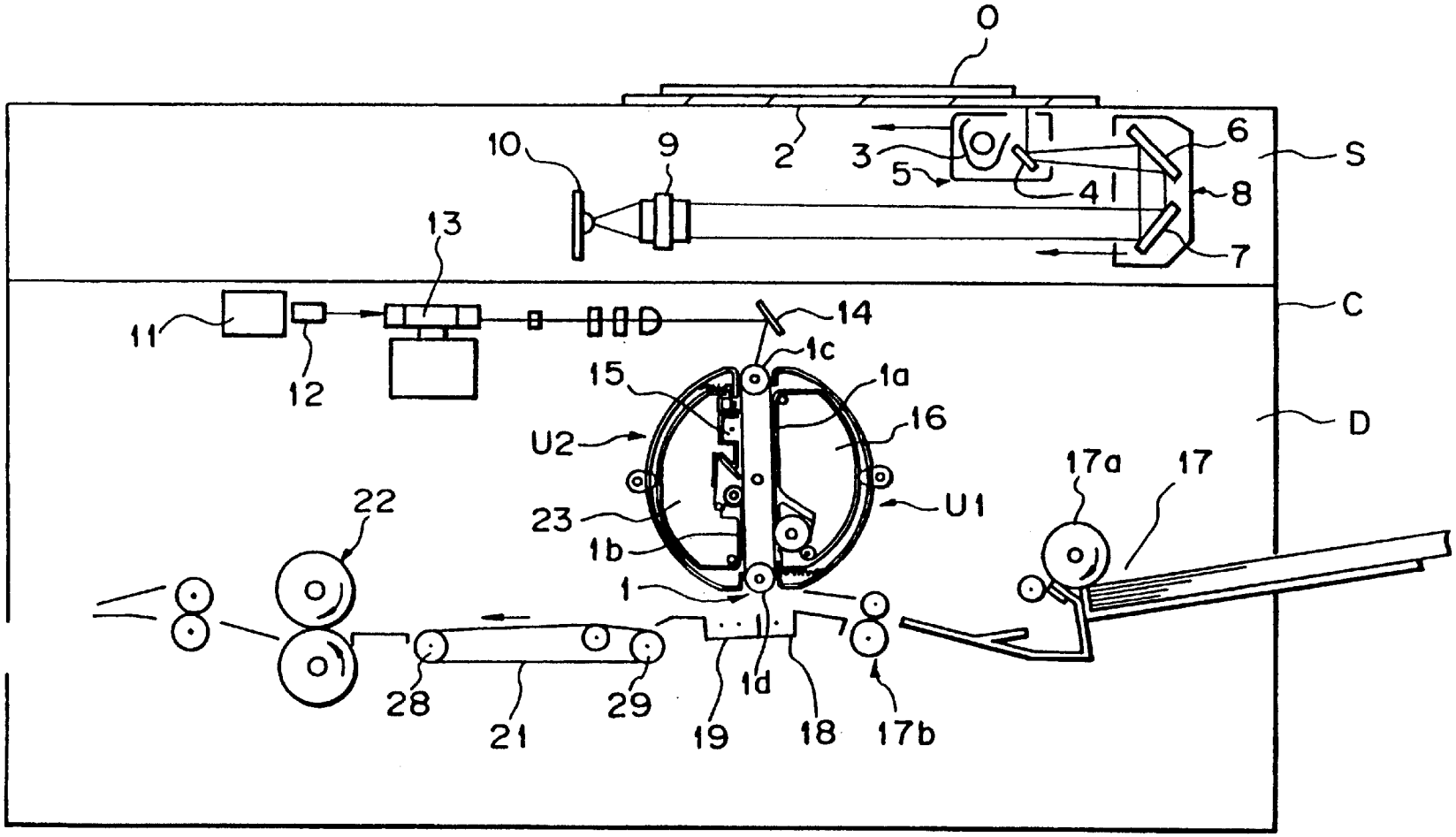
FIG. 1 is a section showing a digital copier which is a specific form of the image forming apparatus in accordance with the present invention.

Referring to FIG. 1 of the drawings, a digital copier which is a specific form of the image forming apparatus in accordance with the present invention is shown. As shown, the copier has housing C and a glass platen 2 mounted on the top of the housing C. A document O is laid on the glass platen 2. A scanning section S is disposed below the glass platen 2 and has first optics 5, second optics 8, a stationary lens 9, and a CCD array or similar image reading device 10. The first optics 5 is movable for reading the document O and includes a lamp 3 and a mirror 4, while the second optics 8 is also movable and includes mirrors 6 and 7. Specifically, as a print switch provided on an operating section of the copier is pressed, the first and second optics 5 and 8 are moved in particular directions as indicated by arrows to thereby scan the document O. The image of the document O is read by the image reading device 10 via the optics 5 and 8 and lens 9, converted to an electric signal, digitized, and then processed.

An image forming section D is arranged below the scanning section S. The image forming section D has various electrophotographic process devices such as a laser diode (LD) 11, a LD drive board 12, a polygonal mirror 13, a mirror 14, a photoconductive element in the form of a belt 1, a developing device 16, a cleaning device 23, a main charger 15, a transfer charger 18, and a separation charger 19, as well as a transport belt 21 and a fixing roller pair 22. A sheet feed section 17 is located upstream of an image transfer station and loaded with a stack of recording sheets. A pick-up roller 17a feeds the recording sheets one by one toward a register roller pair 17b. The register roller pair 17b drives the sheet at a predetermined timing toward the image transfer station defined between the belt 1 and the transfer charger 18. The signal generated by the image reading device 10 and processed is applied to the LD drive board 12. In response, the LD drive board 12 applies a drive signal to the LD 11 with the result that the LD 11 emits a laser beam having been modulated by the drive signal. The laser beam is routed through the polygonal mirror 13 and mirror 14 to reach the belt 1 whose surface has been uniformly charged by the main charger 15. As a result, a latent image representative of the document O is formed on the belt 1. The latent image is developed by the developing device 16 to become a toner image. When the toner image is transported by the belt 1 to the lower end where the downward run of the belt 1 merges into the upward run, the transfer charger 18 transfers the toner image to the recording sheet by corona discharge. After the image transfer, the separation charger 19 separates the sheet from the belt 1. The sheet carrying the toner image thereon is further driven to the fixing roller pair 22 to have the toner image fixed thereon and then driven out of the housing C. The cleaning device 23 removes the toner remaining on the belt 1 after the image transfer.

Figure 2:
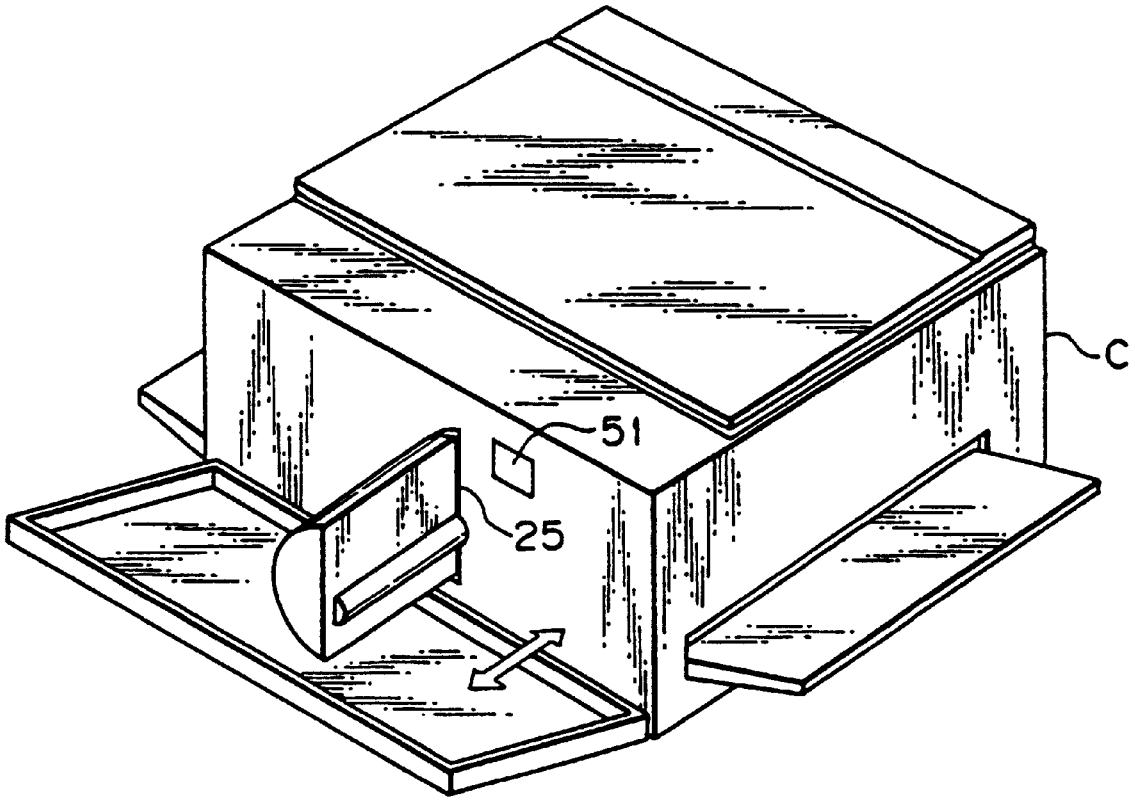
FIG. 2 is a perspective view of the digital copier.

In the illustrative embodiments of the present invention to be described, the photoconductive belt 1 is implemented as an endless belt and passed over rollers, which are spaced apart: by a predetermined distance, such that it has a flat oblong vertical section, as shown in FIG. 1. The developing device, 16, cleaning device and other major process units for forming an image are selectively mounted on a pair of units U1 and U2 having a substantially identical semicylindrical configuration. The two units U1 and U2 are positioned at opposite sides of the parallel flat portions of the belt 1 and engageable with the latter, as described later in detail. An electrophotographic process unit made up of the units U1 and U2 and belt 1 has a generally cylindrical configuration having an axis extending in a direction perpendicular to the sheet surface of FIG. 1. Such a process unit is bodily rotatable about the axis thereof. When the units U1 and U2 are rotated together with the belt 1 until either of them aligns with a generally semicircular opening 25, FIG. 2, formed through the side wall of the housing C, the unit aligned with the opening 25 can be removed via the opening 25 and replaced with another unit. The belt 1 extends in the vertical direction and has parallel runs 1a and 1b which move downward and upward, respectively. When the opposite runs 1a and 1b of the belt 1 are held between the units U1 and U2, the upper and lower curved ends 1c and 1d, respectively, are bare and define an exposure position and an image transfer position. Therefore, it is not necessary to form an extra opening for image formation in the unit U1 or U2, i.e., the units U1 and U2 each having a substantially semicylindrical configuration can cover the entire belt 1 except for the curved portions 1c and 1d.

When the copier is not in operation or when maintenance is needed, the electrophotographic process devices constructed into the units U1 and U2 are released from the belt 1. For example, when the developing device substantially runs out of toner while the copier is in operation or when a toner collecting tank included in the cleaning device is full, it is necessary to supply a toner or to discard the waste toner by interrupting the operation of the copier. In such a case, the embodiments of the present invention each displays an alarm and a guidance on an operation and display section provided on the copier body. As the operator manipulates an operation panel as instructed by the guidance, the unit U1 for development or the unit U2 for cleaning is brought into alignment with the opening 25. Then, the operator can pull out the unit of interest U1 or U2 and then insert a substitute unit through the opening 25. This allows any person to perform such replacement with ease. In addition, since the developing unit U1 and cleaning unit U2 are symmetrical to each other with respect to the axis of rotation, they can be inserted into the opening 25 in any order without being distinguished from each other. Hence, even a person not accustomed to the copier can safely set the units U1 and U2 without errors.

As stated above, to supply fresh a toner or to discard a waste toner, the operator has only to pull out one of the two units U1 and U2 through the same opening 25 and then insert a substitute new unis, i.e., it is not necessary for the operator to open a panel provided on the housing C. The operator, therefore, can effect maintenance without calling for or awaiting a serviceman. Moreover, the efficiency of maintenance is enhanced partly because the labor required of the operator is only negligible and partly because the down time and waiting time of the copier is saved.

Preferred embodiments of the present invention will be described hereinafter.

First Embodiment

Figure 3:
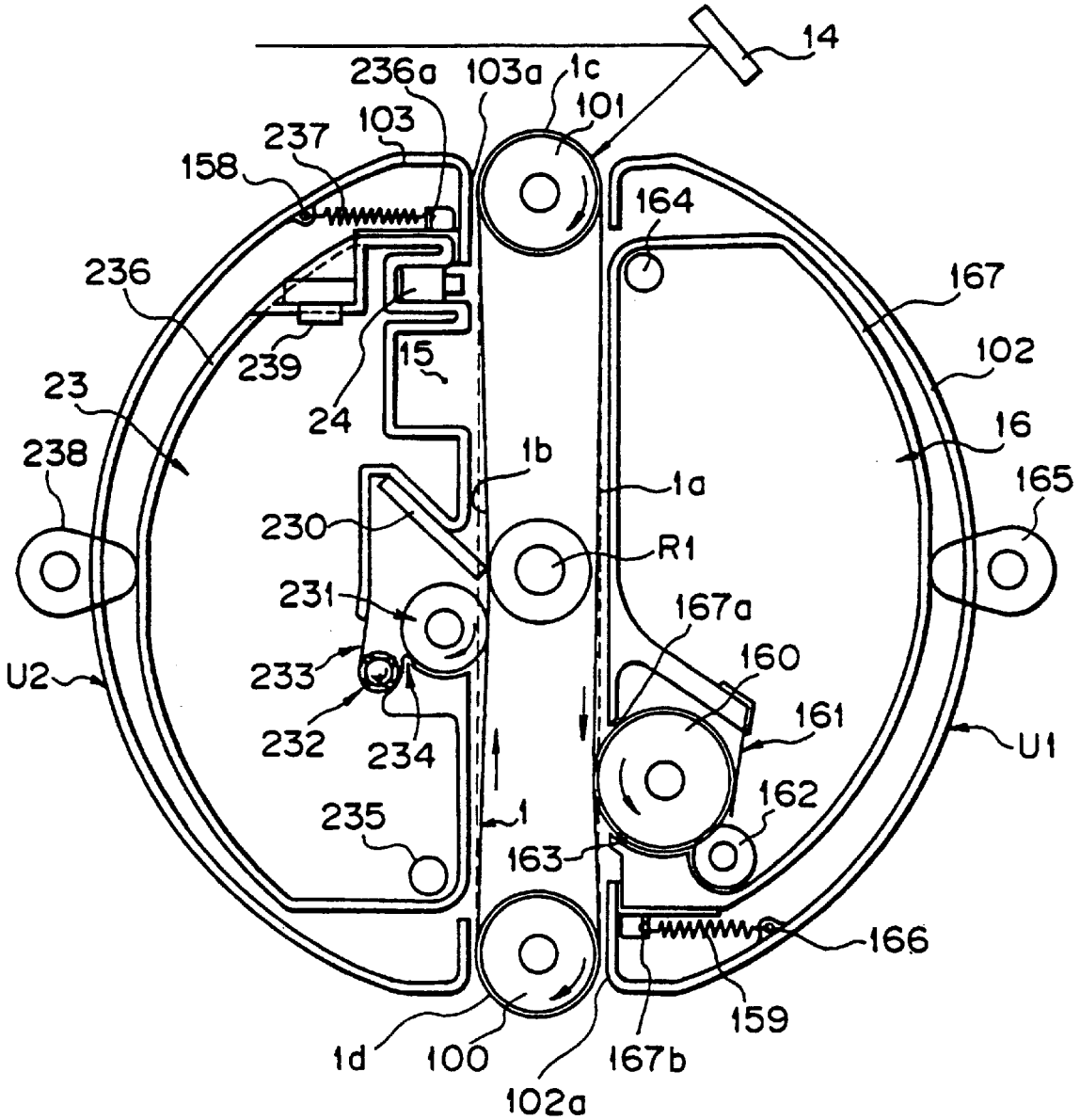
FIG. 3 is a front view showing an electrophotographic process unit representative of a first embodiment of the image forming apparatus in accordance with the present invention in a locked condition.
Figure 4:
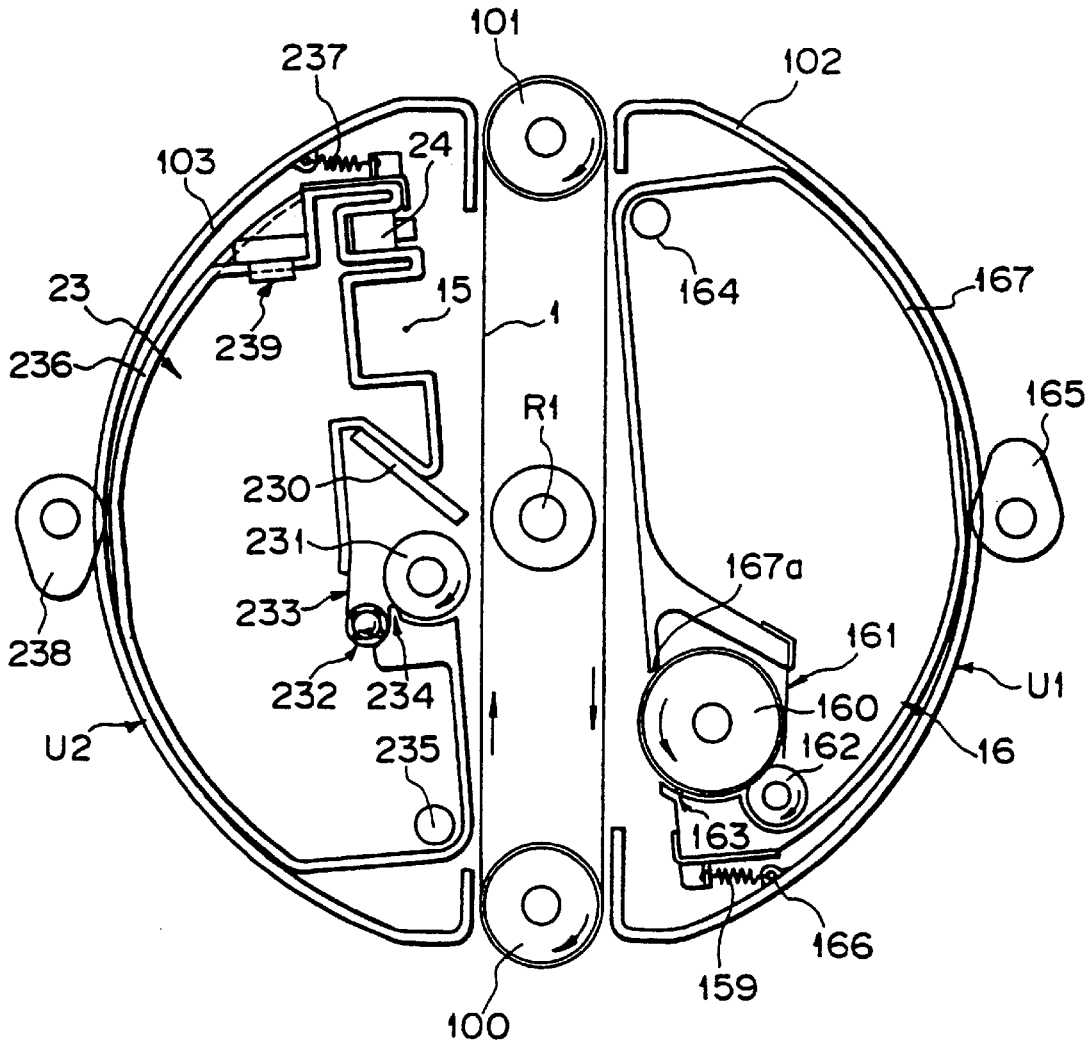
FIG. 4 is a view similar to FIG. 3, showing the process unit in an unlocked condition.

Referring to FIGS. 3 and 4, an electrophotographic process unit representative of a first embodiment of the present invention is shown in an locked position and an unlocked position, respectively. As shown, the belt 1 made of an organic photoconductor (OPC) is passed over rollers 100 and 101 having the same diameter. The rollers 100 and 101 are rotated clockwise to in turn rotate the belt 1 in a direction indicated by arrows in the figure. The developing unit U1 and the cleaning unit U2 are respectively located to face the opposite runs 1a and 1b of the belt 1 which move in opposite directions to each other, as stated earlier. Regarding the vertical extension, the two units U1 and U2 are symmetrial to each other with respect to the axis of rotation. The belt 1 and units U1 and U2 are bodily rotatable about an axis R1. This allows the units U1 and U2 to be loaded in the copier body in any desired order. The curved portions 1c and 1d of the belt 1 which wrap around the rollers 101 and 100, respectively, are exposed to the outside through the gaps between the contours of the units U1 and U2. The curved portions 1c and 1d define respectively an exposure position to which a laser beam is incident and an image transfer position for transferring a toner image to a recording sheet.

The developing unit U1 has a casing 102 accommodating the developing device 16. The developing device 16 has a developing roller 160 having magnets therein, a toner tank 167, and an agitator 162 for agitating a toner. An opening 167a is formed through the flat portion of the toner tank 167 adjacent to one end the flat portion. The developing roller 160 is rotatably mounted on the developing device 16 such that pat of the periphery thereof faces the opening 167a. In the toner tank 167, the agitator 162, a discharge brush 163 and a developing blade 161 are arranged around the developing roller 16. The discharge brush 163 is located in the vicinity of the opening 167a. The toner tank 167 is filled with a toner. The agitator 162 is rotated to agitate the toner in the toner tank 167 while feeding it toward the developing blade 161. The developing blade 161 deposits the toner on the periphery of the developing roller 160 in a predetermined thickness. The developing roller 160 in rotation transports the toner to a latent image electostatically formed on the belt 1 which is held in contact with the roller 160. As a result, the toner is electrostatically transferred to the latent image to develop it. Part of the toner having not deposited on the belt 1 is transported by the developing roller 160 to the discharge brush 163. Then, this part of toner is discharged by the discharge brush 163 and then returned to the toner tank 167. The developing device 16 is supported at one end thereof by a positioning pin 164 and is bodily rotatable about the pin 164. The casing 102 has a hook portion 166 while the toner tank 167 has a hook portion 167b at the free end thereof. A spring 159 is anchored at opposite ends thereof to the hook portions 166 and 167a to constantly bias the entire developing device 16 counterclockwise about the pin 164, i.e., in a direction for moving the developing roller 160 away from the belt 1. In an image forming condition, a solenoid, not shown, rotates a cam 165 associated with the developing device 16 to a position shown in FIG. 3. The cam 165 presses the outer periphery of the toner tank 167 toward the belt 1 against the action of the spring 159 until the free end of the tank 167 abuts against a stop 102a. The stop 102a is formed by bending one end of the casing 102 inwardly. In this condition, the developing roller 160 presses the corresponding portion of the belt 1 by a predetermined pressure. The developing unit U1 and cleaning unit U2 are fixed in place by fixing means, not shown, and prevented from rotating about the axis R1.

The cleaning unit U2 has a flat portion which faces the other run 1b of the belt 1. A casing 103 accommodates the cleaning device 23 in the flat portion thereof. The cleaning device 23 has the main charger 15 for uniformly charging the belt 1, and the eraser 24. A collecting tank 236 has an opening 236a in alignment with the main charger 15 and eraser 24 in a portion thereof which faces the run 1b of the belt 1. A cleaning blade 230 and a rotatable fur brush 231 are located in the vicinity of the opening 236a and in contact with the belt 1. A flicker bar 234 is formed integrally with the tank 236 and disposed in the opening 236a in contact with the fur brush 231. A toner separating plate 233 extends out from the case 236 and presses against a rotatable toner collecting rod 232. The separating plate 233 and collecting rod 232 are disposed in the opening 236a in such a manner as to face the flicker bar 234. The flicker bar 234, separating plate 233 and collecting rod 232 close the opening 236a in cooperation. A full sensor 239 is disposed in the tank 236 in close proximity to the eraser 23 so as to generate an alarm signal when the tank 236 is filled with the waste toner. The tank 236 is rotatably supported at one end thereof by a positioning pin 235 which is positioned symmetrically to the positioning pin 164 of the developing device with respect to the axis of rotation R1. The casing 103 has a hook portion 158 while the tank 236 has a hook portion 236b at the outer edge of the free end thereof. A spring 237 is anchored at opposite ends thereof to the hook portions 158 and 236b. In an image forming condition, a cam 238 is rotated to urge the back of the tank 236 toward the belt 1 against the action of the spring 237 until the free end of the tank 236 abuts against a stop 103a. The stop 103a is also formed by bending the edge of the casing 103 inwardly. In this condition, the cleaning blade 230 and fur brush 231 are pressed against the upward run 1b of the belt 1. The fur brush 231 scrapes off the toner remaining on the belt 1 while the fur brush 231 beat down the toner from the fur brush 231. The cleaning blade 230 removes the toner having not scraped off by the fur brush 231. The toner so removed from the belt 1 is sequentially deposited in the tank 236 by the rotation of the collecting rod 232 and the restriction by the separating plate 233. After the belt 1 has been so cleaned, the main charger 15 uniformly charges the surface of the belt 1. Subsequently, the eraser 24 erases the charge except for an image region where a latent image should be electrostatically formed, thereby preparing the belt 1 for another image forming cycle.

As stated above, the developing device 16, cleaning device 23, main charger 15 and eraser 24 execute a sequence of latent image forming steps with the belt 1.

When the toner tank 167 runs out of toner, a toner end sensor, not shown, detects such a condition due to the decrease in the load on the agitator 162 and generates a toner end signal. When the collecting tank 236 is full, the full sensor 239 detects it and causes the operation and display section to display an alarm, as stated earlier. This urges the operator to replace either of the developing unit U1 and cleaning unit U2. As the operator presses a particular switch provided on the operation panel for effecting maintenance, the belt 1 and units U1 and U2 are unlocked and bodily rotated about the axis R1 until the unit U1 or U2 which should be replaced aligns with the opening 25. Specifically, when the solenoid, not shown, is deenergized, the cam 165 or 238 is rotated unlock the developing device 16 from the casing 102 or unlock the cleaning device 23 from the casing 103. As a result, the toner tank 167 or the collecting tank 236 is rotated about the positioning pin 164 or 235 away from the belt 1 by the spring 159 or 237. In this condition, the toner tank 167 or the collecting tank 236 is ready to be pulled out through the opening 25. The toner tank 167 or the collecting tank 236 to be replaced is implemented as a cartridge which can be attached and detached by a single manual operation (hereinafter referred to as a process pack). After removing the used tank 167 or 236, the operator inserts a new tank 167 or 236 and then presses a button provided on the operation panel for entering the end of replacement In response, the cam 165 or 238 is again rotated to lock the associated process pack, and then the developing unit U1 and cleaning unit U2 are rotated about the axis R1 to the predetermined vertical position. Then, the copier is ready to operate again.

Since the casings 102 and 103 of the units U1 and U2 have an identical contour, the two different kinds of process packs can each be mounted on either side of the opposite runs 1a and 1b of the belt 1. As stated above, the toner tank 167 and collecting tank 236 have generally semicylindrical configurations which are identical with and symmetric to each other, and tanks 167 and 236 are rotatable integrally with each other. The operator, therefore, can readily replace the developing device 16 run out of toner or full of waste toner simply by pulling out the process pack of interest through the opening 25, i.e., without calling for a serviceman. Since the major part of the belt 1 and the major process devices are constantly covered by the casings 102 and 103, the operator intending to, for example, locate a sheet jam or to remove a jamming sheet is prevented from inadvertently touching and, therefore, smearing or damaging the belt 1. Moreover, the entire electrophotographic process unit can be unlocked except for the image forming condition to release the process devices from the belt 1. This is successful in freeing the belt 1 and cleaning blade 230 from deterioration otherwise caused by continuous pressurization and preventing the toner from effecting the image formation by being slidified between the belt 1 and the blade 230.

Figure 5A:
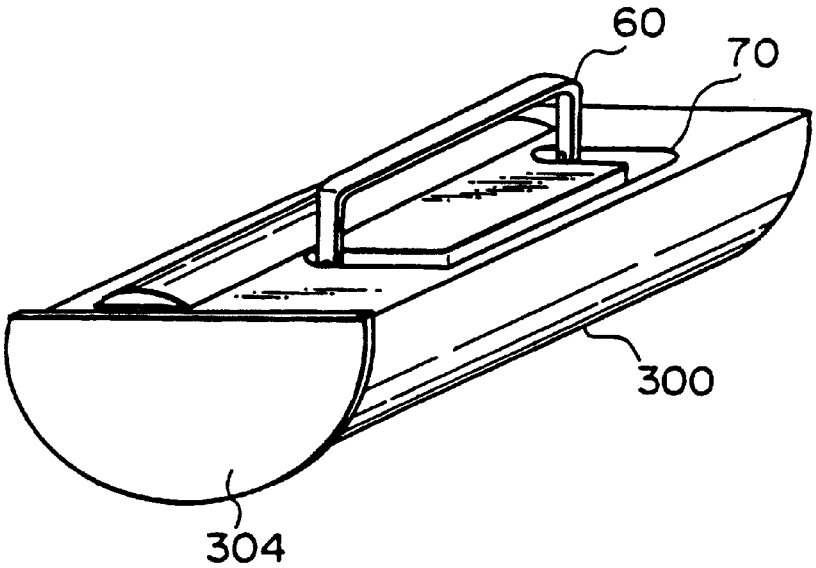
FIGS. 5A and 5B are perspective views each showing a process pack included in the embodiment in a particular position.
Figure 5B:
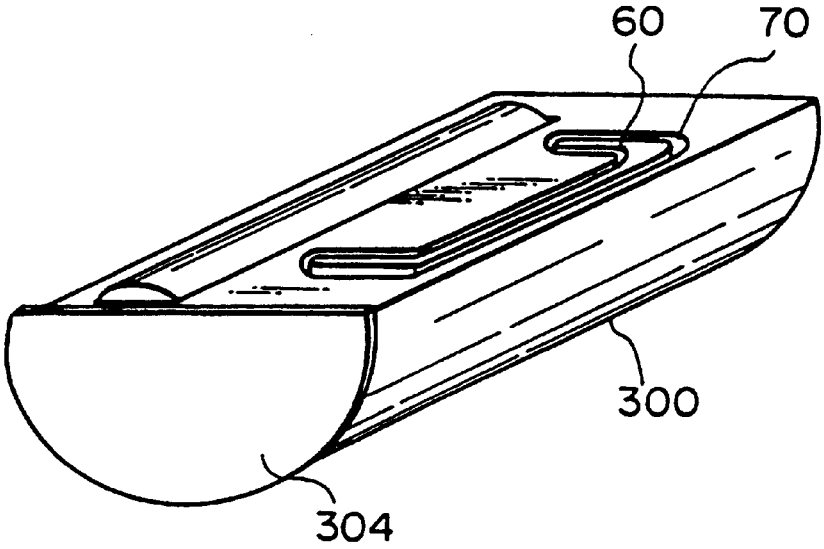

Each process pack is provided with a handle, as shown in FIGS. 5A and 5B. Specifically, the process pack having been pulled out of the copier body is laid on a table with a handle 60 raised as shown in FIG. 5A or lowered as shown in FIG. 5B. While the process pack is constituted by a hermetically sealed container except for the opening 167a or 236a thereof, the toner or the waste toner stored therein is apt to leak through the opening 167a or 236a when the process pack having been pulled out through the opening 25 is carried or put on a table. If the operator carries the process pack in the horizontally long position by holding it by both hands, the operation cannot touch or operate any other thing. In light of this, the handle 60 is provided on the flat portion of the sealed container of the process pack to be movable between the raised position and the lowered position. Opposite ends of the handle 60 are hinged to the flat portion of the sealed container such that they lie in a vertical plane containing the center of gravity of the process pack when brought to the raised position. When the handle 60 is needless, it is received in a groove 70. When the process pack is pulled out of the copier body, the handle 60 is raised to the position shown in FIG. 5A. When the process pack is to be inserted into the copier body, the handle 60 is lowered to the position shown in FIG. 5B. Further, the sealed container of the process pack has a front end plate 304 which extends lightly radially outward from the semicylindrical portion 300 and, therefore, has a slightly greater cross-sectional area than the semicylindrical portion 300. In addition, the front plate 304 has a slightly greater radial dimension than the casing 102 or 103. Hence, while the body of the process pack can enter the casing 102 or 103, the end plate 304 is prevented from entering it by the front edge of the casing 102 or 103. This is successful in preventing the process pack from being inserted into the copier body in a wrong position and in, when former is inserted into the copier body in a correct position into the latter, accurately positioning it.

Figure 6A:
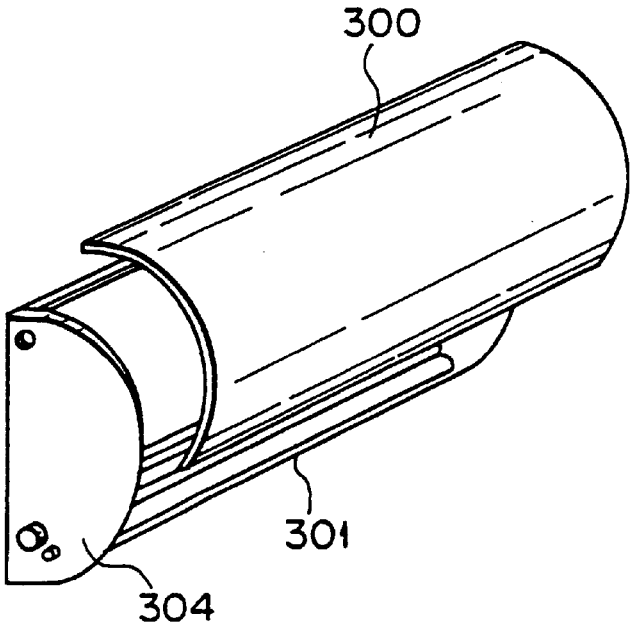
FIGS. 6A and 6B are exploded perspective views each showing a process pack in assembly.
Figure 6B:
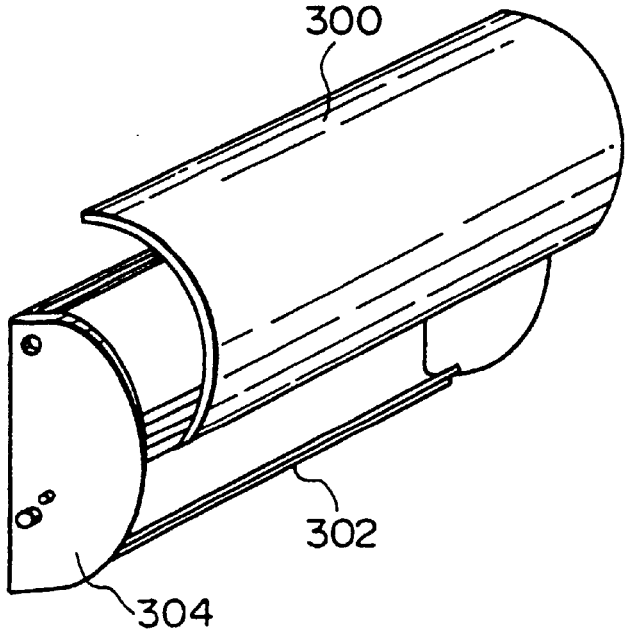

As shown in FIG. 6A, the toner tank 167 is made up of a developing function section 301, and a semicylindrical container cover 300. As shown in FIG. 6B, the collecting tank 236 is made up of a cleaning function section 302 and a semicylindrical container cover 300. The function sections 301 and 302 are each combined with associated cover 300 and then connected to the latter by fusing. Since both of the function sections 301 and 302 include the covers 300 having an identical configuration, the two different kinds of process packs can be produced on quantity basis. The containers may be made of resin to facilitate the assembly and cut down the cost.

Second Embodiment

Figure 7:
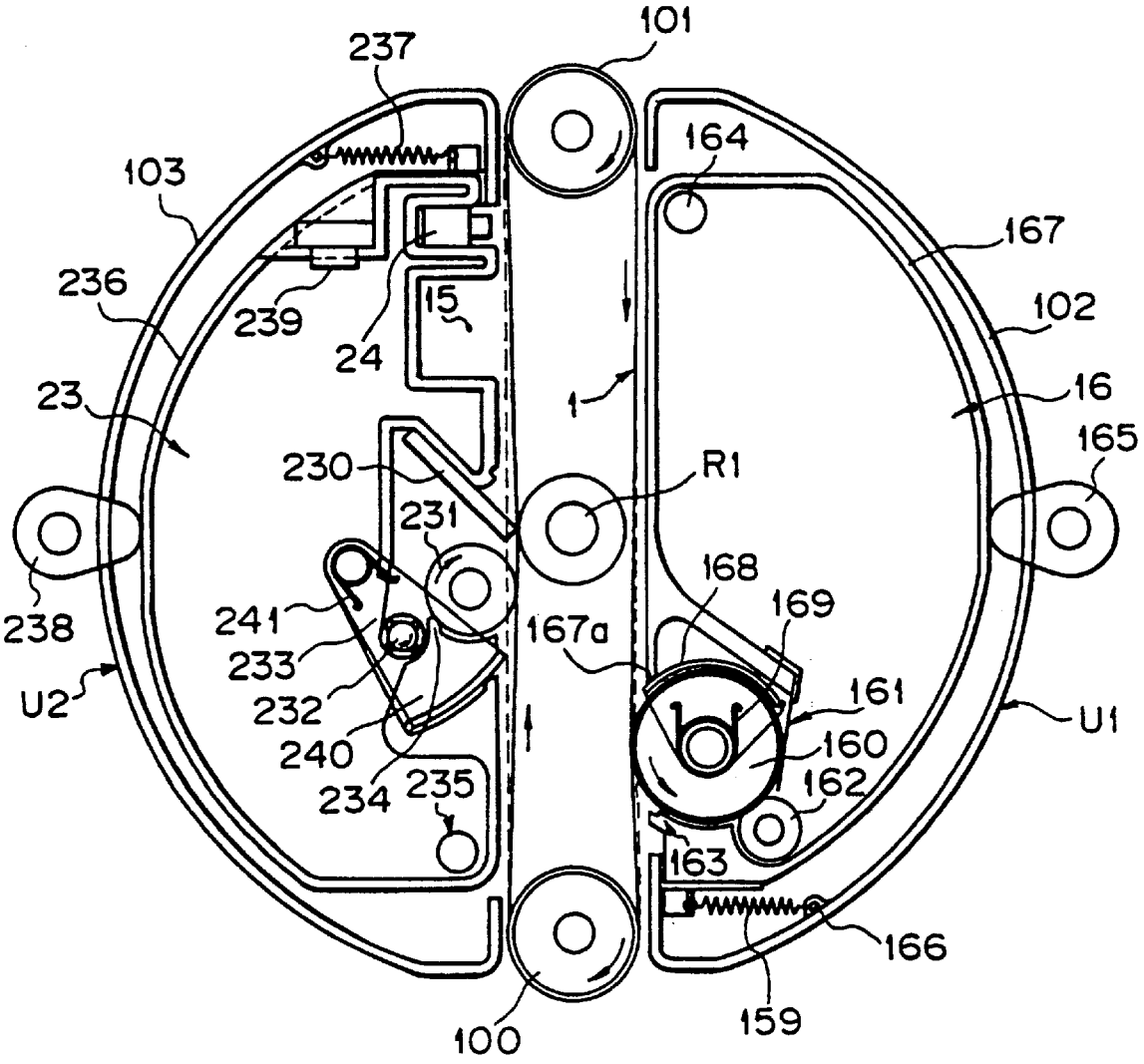
FIG. 7 is a front view of a second embodiment of the present invention in a locked condition.
Figure 8:
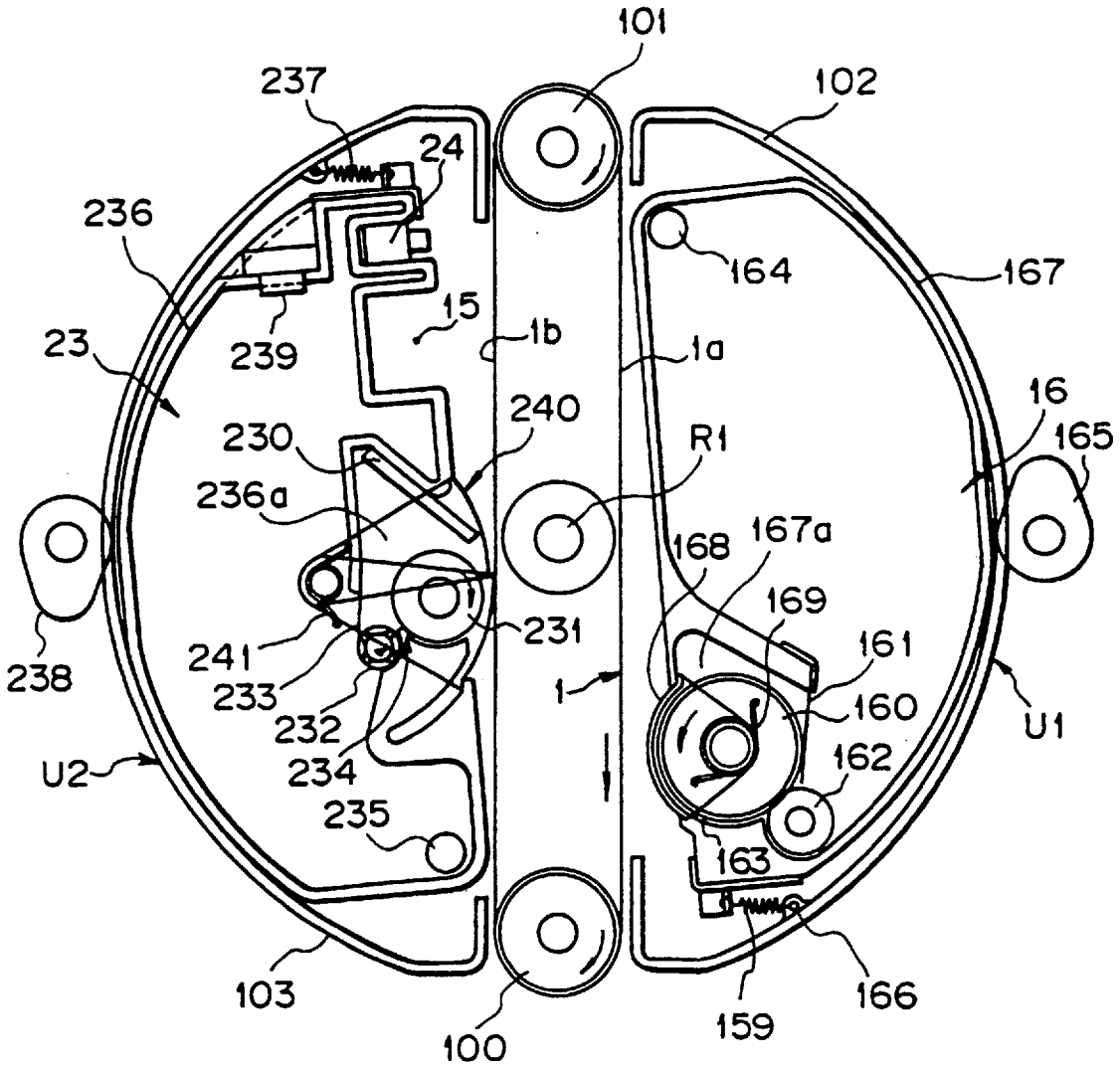
FIG. 8 is a view similar to FIG. 7, showing the embodiment in an unlocked condition.

Referring to FIGS. 7 and 8, a second embodiment of the present invention will be described. The conditions shown in FIGS. 7 and 8 correspond to FIGS. 3 and 4, respectively. This embodiment is distinguishable from the first embodiment in that when the cam 165 or 238 is rotated to unlock the associated unit U1 or U2, the opening of the process pack associated with the unit U1 or U2 is closed by a shutter mechanism. In the figures, the same or similar parts or structural elements are designated by like reference numerals, and redundant description will be avoided for simplicity.

Specifically, as shown in FIG. 7, a shutter 168 is concentrically associated with the developing roller 160 of the developing device 16. A coiled torsion spring 169 is affixed to the shaft of the developing roller 160 coaxially with the roller 160. The torsion spring 169 is anchored at one end to the toner tank 167 and at the other end to the shutter 168. In an unlocked condition (FIG. 8), the shutter 168 is urged by the torsion spring 169 in a direction for closing the opening 167a of the toner tank 167. In a locked condition or image forming condition (FIG. 7), the shutter 168 uncovers the opening 167a against the action of the torsion spring 169. Likewise, a coiled torsion spring 241 is positioned in close proximity to the toner separating plate 233 of the cleaning device 23. This torsion spring 241 is anchored at one end to the collecting tank 236 and at the other end to one of two members which constitute a shutter 240. The dual shutter 240 is rotatable about the core of the torsion spring 241. In the unlocked condition (FIG. 8), the shutter 240 is urged by the torsion spring 241 in a direction for covering the opening 236a. As shown in FIG. 8, when the cam 165 is rotated to unlock the associated unit U1, the toner tank 167 is moved away from the downward run 1a of the belt 1 by the action of the spring 159. As a result, the shutter 168 is rotated by the torsion spring 169 to cover the opening 169a. A gear mechanism, not shown, interlocks the shutter 168 to the toner tank 167.

As stated above, when the developing device 16 is pulled out, the shutter 168 closes the opening 167a of the toner tank 167. In this condition, the toner is prevented from leaking via the opening 167a and smearing the operator's body or the room. Likewise, when the cam 238 is rotated to unlock the cleaning unit U2, the collecting tank 236 is rotated away from the upward run 1b of the belt 1 and, at the same time, the shutter 240 closes the opening 236a of the collecting tank 236 due to the force of the torsion spring 241. As a result, the waste toner collected in the tank 236 is prevented from leaking to the outside. In this embodiment, too, the developing unit U1 and cleaning unit U2 have an identical sectional shape and, therefore, can each be mounted on any side of the opposite runs 1a and 1b of the belt 1. If desired, the process packs may be colored for distinction, e.g. the toner tank 167 and the collecting tank 236 may be painted red and blue, respectively. In such a case, the kinds of the two process packs may be displayed in red and blue on the operation and display section. This allows the operator to see a process pack to be mounted on the basis of the color.

Figure 9:
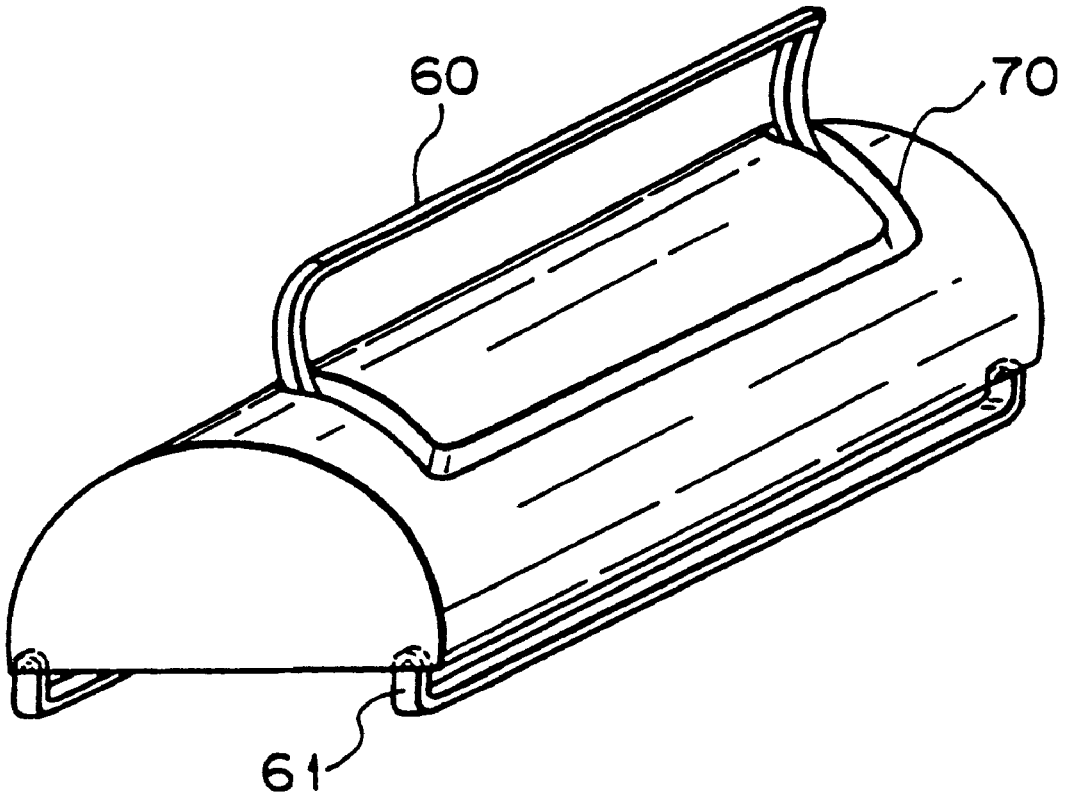
FIG. 9 is a perspective view of a process pack included in the second embodiment and put on a table

FIG. 9 shows the process pack of the illustrative embodiment which is pulled out from the copier body and placed on a table. In the first embodiment, since the process pack has the opening 167a or 236a in the flat portion thereof, it has to be put on a table with the curved wall facing downward in order to prevent the toner from leaking. However, such a curved bottom is not stable and is apt to roll when subjected to even a slight shock, causing the toner to leak. By contrast, since the second embodiment causes the shutter 168 or 240 to close the associated opening 167a or 236a of the process pack, the toner or the waste toner does not leak even when the process pack is placed on a table with the flat portion facing downward. Legs 61 extend out from opposite ends of the flat portion of the process pack. When the process pack is put on a table in the above-mentioned position, the legs 61 prevent the shutter 168 or 240 slightly protruding from the flat portion and the process device facing the opening 167a or 236a from contacting the table. When the handle 60 is raised, opposite ends thereof hinged to the process pack lie in a vertical plane containing the center of gravity of the process pack. The handle 60 is received in the groove 70 when not necessary.

Figure 10:
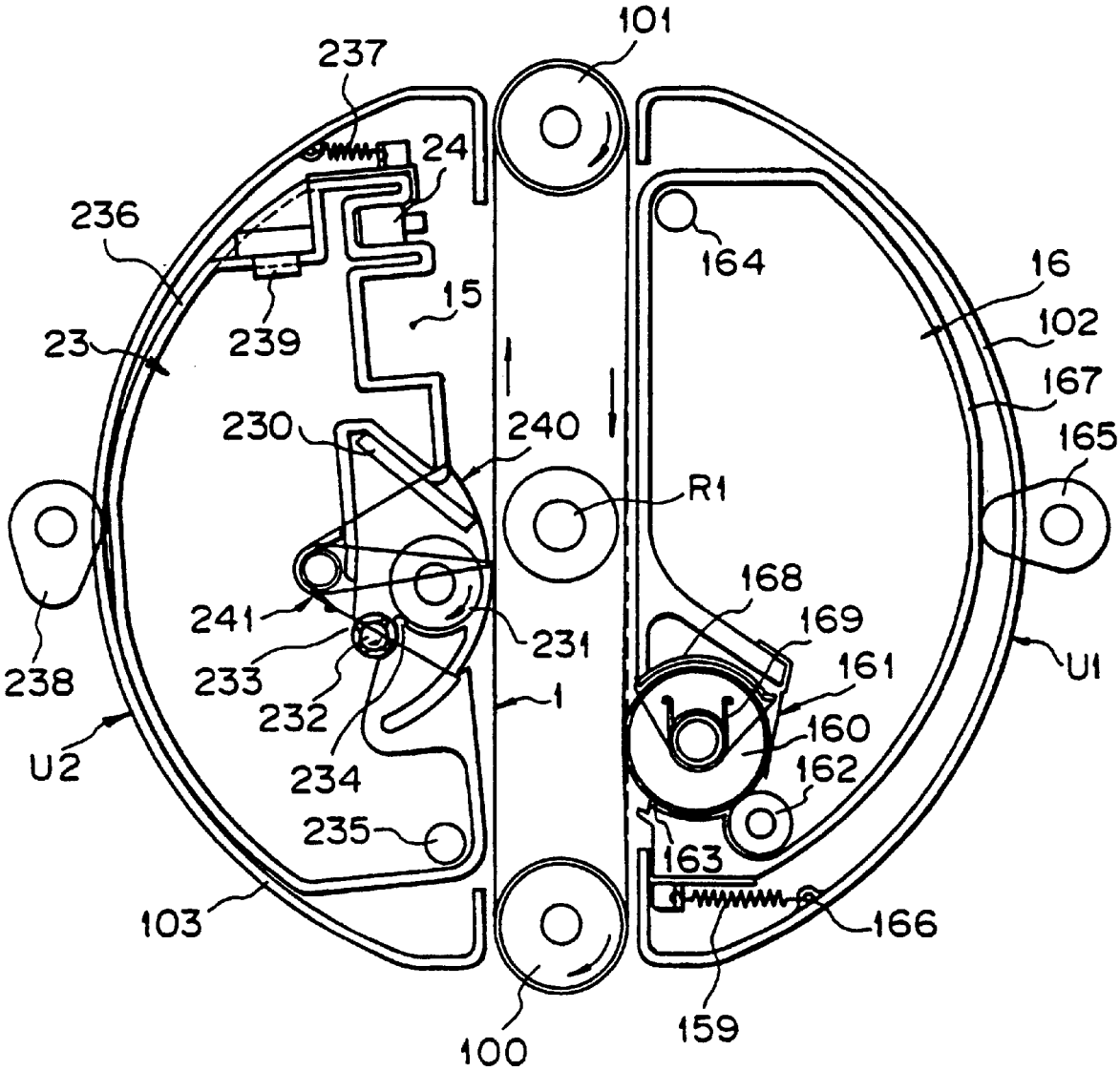
FIG. 10 is a front view showing a modified form of the second embodiment in a locked condition.
Figure 11:
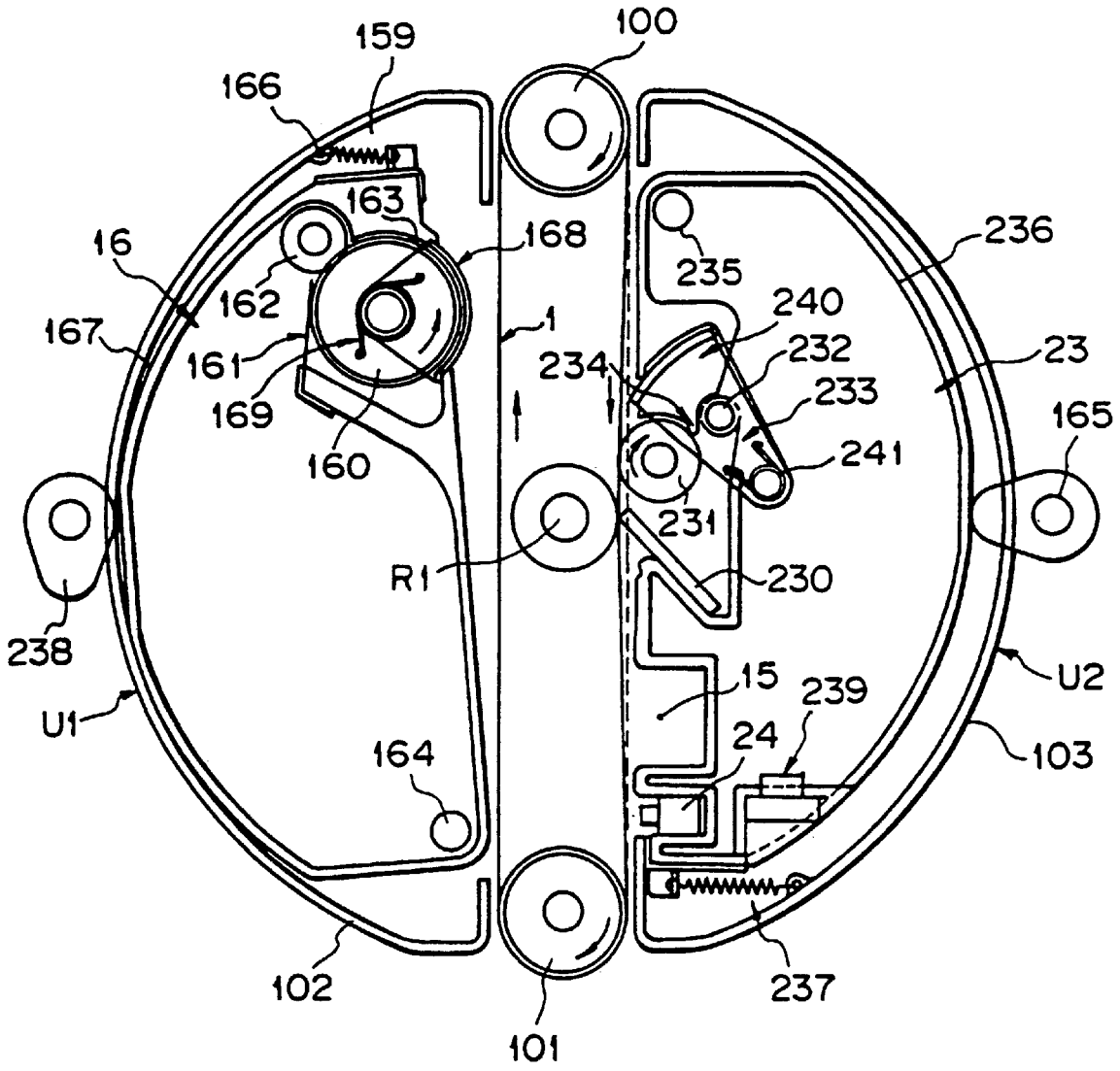
FIG. 11 is a front view showing the modification in an unlocked condition.

While the embodiment moves both the process pack of the developing unit U1 and the process pack of the cleaning unit U2 away from the belt 1 in the event of replacement, an arrangement may be so made as to move only the unit which should be pulled out from the opening 25 away from the belt 1. Specifically, FIG. 10 shows a condition wherein the developing unit U1 is aligned with the opening 25, and only the process pack of the developing unit U1 is spaced apart from the belt 1. FIG. 11 shows a condition wherein the cleaning unit U2 is aligned with the opening 25, and only the process pack of the cleaning unit U2 is spaced apart from the belt 1.

Third Embodiment

Figure 13:
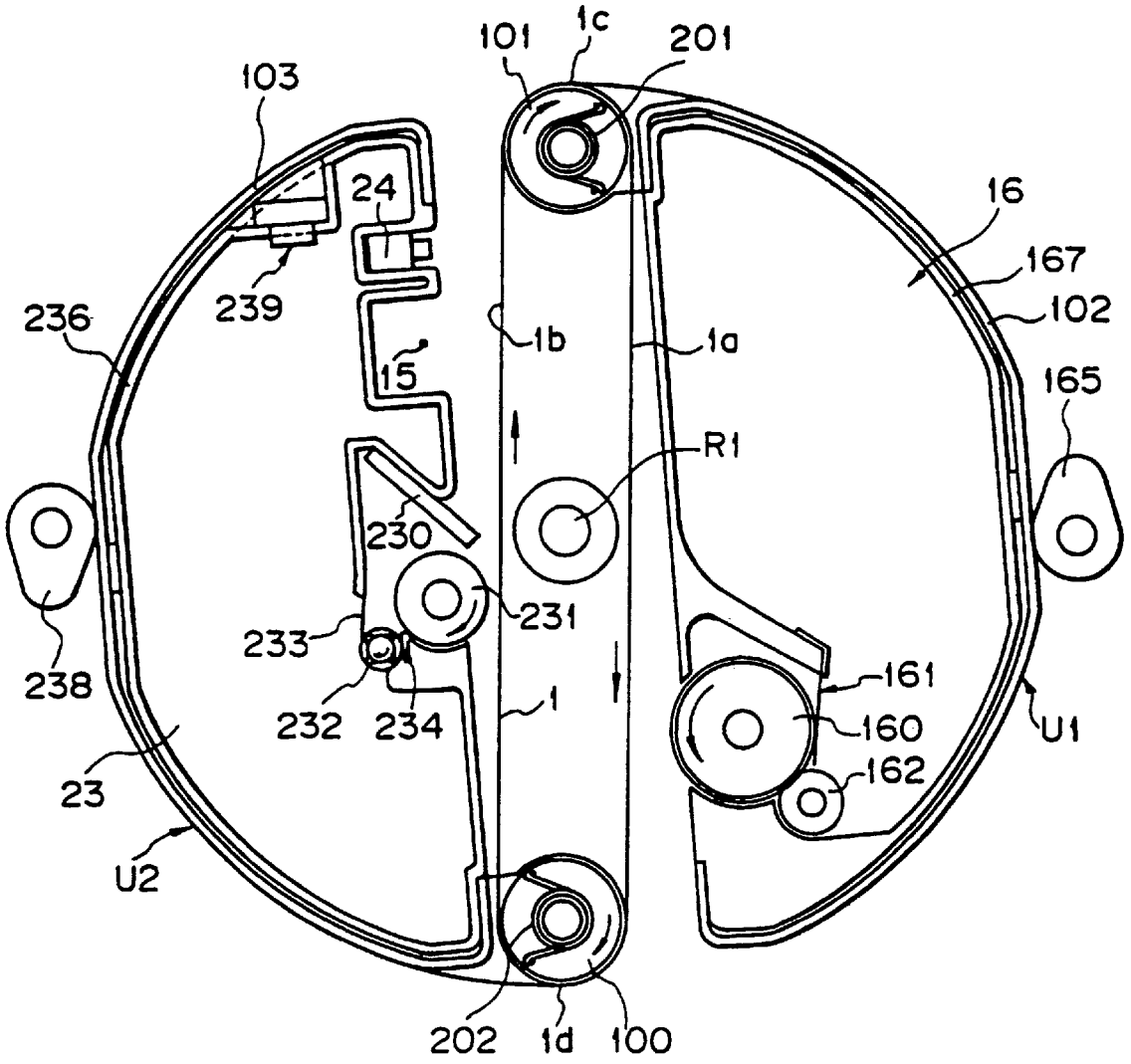

FIGS. 12 and 13 show a third embodiment of the present invention in a locked condition and an unlocked condition, respectively. This embodiment is distinguishable from the first embodiment in that the positioning pins 164 and 235 are absent, and in that the casing 102 and developing unit and the casing 103 and cleaning unit U2 are respectively integrally rotatable about the rollers 100 and 101 to an unlocked position when the associated cams 16 and 238 are rotated. Specifically, the developing unit U1 has the toner tank 167 and the casing 102 accommodating the toner tank 167 constructed into a single body which is rotatable about the axis of the roller 101. A coiled torsion spring 201 is mounted on the shaft of the roller 101 coaxially with the roller 101 and constantly biases the developing unit U1 away from the downward run 1a of the belt 1. The cam 165 presses the casing 102 such that the developing roller 160 presses against the run 1a of the belt 1, against the action of the torsion spring 168. Likewise, the cleaning unit U2 has the collecting tank 236 and the casing 103 accommodating the tank 236 constructed into a single body which is rotatable about the axis of the roller 100. A coiled torsion spring 202 is mounted on the shaft of the roller 100 coaxially with the latter to constantly bias the cleaning unit U2 away from the upward run 1b of the belt 1. The cam 238 presses the casing 103 such that the cleaning blade 230 and fur brush 231 press against the run 1b of the belt, against the action of the torsion spring 202. As shown in FIG. 13, when the cam 165 is rotated to unlock the developing unit U1, the casing 102 with the toner tank 167 is rotated away from the run 1a of the belt 1 by the torsion spring 201 to allow the tank 167 to be removed through the opening 25. Likewise, when the cam 238 is rotated to unlock the cleaning unit U2, the casing 103 with the collecting tank 236 is rotated away from the belt 1 by the torsion spring 202 to allow the tank 236 to be removed through the opening 25.

In this embodiment, too, the belt 1 is covered by the units U1 and U2 except for opposite ends 1c and 1d thereof which wrap around the rollers 101 and 100, respectively. The ends 1c and 1d define the exposure position and the image transfer position, respectively. Of course, the developing unit U1, cleaning unit U2 and belt 1 are bodily rotatable to a position where either of the units U1 and U2 faces the opening 25 for the replacement of the process pack.

In the illustrative embodiment, each of the process packs has an oscillator therein which oscillates at a particular high frequency. In this case, a microswitch is provided on the handle of each process pack. When the operator holds any of the process packs, the microswitch of the process pack is closed to apply a source voltage to the oscillator built in the process pack. A receiver capable of receiving such high frequencies is mounted on the copier body in close proximity to the opening 25. In the event of replacement, as the operator picks up a particular process pack, the oscillator of the process pack transmits a particular high frequency wave to the receiver mounted on the copier body. Then, a controller identifies the kind of the process pack on the basis of the received frequency and displays a guidance message.

As shown in FIG. 14, in this embodiment, the opening 25 formed through the front panel of the copier body has a semicircular shape whose flat portion faces upward. Hence, the process pack is pulled out through the opening 25 with the opening 167a or 236 facing upward. Such an opening 25 allows the operator to remove or insert the process pack by holding the semicylindrical periphery by one hand and holding one end by the other hand.

Specifically, FIGS. 15A and 15B show respectively a condition wherein the process pack is held by right hand and condition wherein it is held by left hand. As these figures indicate, the operator, whether he or she be right-handed or left-handed, can remove or insert the process pack by holding the semicylindrical periphery by one hand and holding one end by the other hand. As shown in FIGS. 16A and 16B, labels or similar indications are provided on the process packs to distinguish the developing unit and the cleaning unit from each other.

Fourth Embodiment

FIG. 17 shows a fourth embodiment of the present invention in a locked condition. As shown, this embodiment differs from the first embodiment in that the eraser 24 is located outside the process unit and not mounted on the collecting tank 236 of the cleaning unit U2. Excluding the eraser 24, which is a process device sparingly susceptible to aging, from the process pack is successful in reducing the cost of the process pack as well as waste.

Fifth Embodiment

FIG. 18 shows a fifth embodiment of the present invention in a locked condition. This embodiment differs from the first embodiment in that the main charger 15 and eraser 24 are excluded from the process unit, and in that the cleaning blade 230 and fur brush 231 are located at a substantial distance from the developing roller 160 and in the vicinity of the free end of the collecting tank 236. With such a configuration, this embodiment achieves the object of the fourth embodiment and, in addition, enhances the collection of waste toner, increases the distance which the cleaning blade 230 and fur brush 231 move in the event of rotation, and causes the opening to face upward when the process pack is removed from the copier body. FIGS. 19A and 19B each shows one of the process packs of the embodiment which has been removed from the copier body and is ready to be carried by hand. In this embodiment, the handle 60 is hinged to the semicylindrical wall of the hermetic container of the process pack at an end portion adjacent to the opening 167a or 236a. The handle 60 may be received in the groove 70 when not used. As shown, when the operator carries the process pack by holding the handle 60, the toner tank 167 or the collecting tank 236 has the opening 167a or 236a thereof closed by the shutter 168 or 240. This, coupled with the fact that the opening 167a or 236a is located in an upper portion of the associated tank 167 or 236, causes the toner or the waste toner to remain in a lower portion of the hermetic container and prevents it from leaking through the opening.

FIGS. 20A and 20B show respectively the developing tank 167 and the collecting tank 236 of the illustrative embodiment in exploded views. As shown, both the tank 167 and the tank 236 include a container cover 303 which defines one half of the flat portion. The container cover 303 constitutes the tank 167 in combination with the developing function section 301 or constitutes the tank 236 in combination with the cleaning function section 302. Specifically, the container cover 303 has a trough-like configuration made up of a curved portion forming substantially one-quarter of a cylinder, and a flat portion having substantially one half of the width of the flat portion of the container. Such an assembly is as advantageous as the assembly described in relation to the first embodiment.

Sixth Embodiment

FIGS. 21 and 22 show a sixth embodiment of the present invention in an image forming condition and a standby condition, respectively. This embodiment is essentially similar to the fifth embodiment except that the developing roller 160 and the cleaning blade 230 and fur brush 231 are so positioned as not to protrude from the flat portions of the developing unit U1 and cleaning unit U2, respectively, that shutter mechanisms are respectively associated with the units U1 and U2 to be movable along the flat portions of the latter, and that a mechanism is provided for pressing the belt 1 against the developing roller 160 and the cleaning blade 230 and fur brush 231 which are exposed through the openings 167a and 236a, respectively.

Specifically, shutters 170 and 242 respectively close the openings 167a and 236a of the toner tank 167 of the developing unit U1 and the collecting tank of the cleaning unit U1 when the associated process packs are pulled out from the copier body. Bars 104 and 105 are rotatably and coaxially mounted on the shafts of the upper roller 100 and lower roller 101, respectively. The bars 104 and 105 are constantly biased to face each other in the vertical direction by tension springs, not shown. Presser rollers 106 and 107 are rotatably mounted on the free ends of the bars 104 and 105, respectively. In the standby condition shown in FIG. 22, the bars 104 and 105 are positioned on a line connecting the shafts of the upper and lower rollers 100 and 102 such that the presser rollers 106 and 107 face each other with the intermediary of the axis of rotation R1. In this embodiment, the cleaning blade 230 and fur brush 231 and the developing roller 160 are each disposed in the associated casing 102 or 103 at a predetermined distance from a plane containing opposite inwardly bent edges of the casing. Hence, even when the process unit is locked, the cleaning blade 230 and fur brush 231 or the developing roller 160 is spaced apart from the belt 1 by a predetermined distance. The shutters 170 and 242 are each slidable along the flat portion of the associated process pack and constantly biased by a tension spring, not shown, in a direction for closing the opening 167a or 236a. In the illustrative embodiment, even when the process units are held in their locked state, the shutters 170 and 242 close their associated openings 167a and 236a so long as the process units are not operated. In this condition, the toner tank 167 and collecting tank 236 are hermetically closed by the shutters 170 and 242, respectively.

When either of the process units should be removed from the copier body, the cam 165 or 238 is rotated to unlock the unit of interest U1 or U2, as in the fifth embodiment. Then, the unit of interest is rotated about the axis R1 to the position where it faces the opening 25. The shutters 170 and 242 extend along the flat portions of the individual process packs. Hence, when the desired process pack is pulled out from the copier body, the flat portion thereof where the opening 167a or 236a is closed by the shutter 170 or 242 constitutes a sealed surface having no projections and is, therefore, easy to handle. In addition, the shutters 170 and 242 are each opened and closed by a simple mechanism and, therefore, free from errors due to, for example, the toner which may stop the mechanism.

As shown in FIG. 21, in an image forming condition, each of the shutters 170 and 242 is caused to retract toward the pin 164 or 235 by a drive mechanism, not shown, against the action of the tension spring, thereby uncovering the opening 167a or 236a. At the same time, each bar 104 or 105 is rotated clockwise by a drive mechanism, no shown, against the force of the tension spring with the result that the associated presser roller 106 or 107 is pressed against the adjoining run 1a or 1b of the belt 1 from the inside. Consequently, the opposite runs 1a and 1b of the belt 1 are pressed against the cleaning blade 230 and fur brush 231 and the developing roller 160, respectively. In this condition, the presser rollers 106 and 107 are rotated by the belt 1 while the belt 1 is in movement.

As stated above, the belt 1 is urged from the inside thereof into pressing contact with the cleaning blade 230 and fur brush 231 and the developing roller and, therefore, can be so urged by only a low pressure.

Seventh Embodiment

FIG. 23 shows a seventh embodiment of the present invention in a locked condition. This embodiment is essentially similar to the second embodiment except that two engaging bodies are rotatable about the axis of rotation R1 and function to eliminate the accidental insertion of an unexpected process pack. The developing unit U1 accommodating the developing device 16, the cleaning unit U2 accommodating the cleaning device 23, and the belt 1 are bodily rotatable about the axis R1, as in the second embodiment. The casing 102 of the developing unit U1 is rotatable about the positioning pin 164 and constantly biased by the torsion spring 159 away from the downward run 1a of the belt 1. When the cam 165 is rotated, it presses the unit U1 such that the developing roller 160 presses against the run 1a of the belt 1 by a suitable pressure, against the force of the torsion spring 159. Likewise, the casing 103 of the cleaning unit U2 is rotatable about the positioning pin 235 and constantly biased by the torsion spring 237 away from the upward run 1b of the belt 1. When the cam 238 is rotated, it presses the unit U2 such that the cleaning blade 230 and fur brush 231 press against the upward run 1b of the belt 1 by a suitable pressure, against the force of the torsion spring 237.

Two generally Z-shaped engaging bodies 500 and 501 are rotatable about the axis R1 and located at different axial positions. Coiled torsion springs 502 and 503 are positioned coaxially with each other to constantly bias the engaging bodies 500 and 501 clockwise, respectively. The engaging body 500 has opposite ends thereof bent in opposite directions to form engaging pieces 500a and 500b. Likewise, the engaging body 501 has engaging pieces 501a and 501b at opposite ends thereof. The engaging pieces 500a and 500b are respectively located at distances l1 and l2 from the axis of rotation R1 which are different from each other. The engaging pieces 501 and 501b are respectively located at the distances l2 and l1 from the axis of rotation R1. The toner tank 167 and cleaning tank 236 are respectively formed with notches 167c and 236c which face the tips of the engaging pieces 500a and 500b, respectively.

In the above construction, assume that both of the process packs are removed from the copier body. Then, the engaging bodies 500 and 501 abut against stops, no shown, to remain in the positions indicated by a phantom line and a solid line in FIG. 23. When the toner tank 167 is mounted on the developing unit U1, the stop is released from the engaging body 500 to allow it to rotate clockwise until the engaging piece 500a mates with the notch 167c. Thereupon, the process unit is bodily rotated about the axis R1 to the position where the cleaning unit U2 aligns with the opening 25. At this instant, the engaging piece 500b is located at the position indicated by a solid line in FIG. 23, i.e., it protrudes from the run 1b of the belt 1. Therefore, the collecting tank 236 having the notch 236c at a position engageable with the protruding engaging piece 500b is the only process pack which can be inserted into the copier body via the opening 25. This prevents an inadequate process pack from being mounted on the copier body. When the stop associated with the other engaging body 501 is released, the tip of the engaging piece 501a of the engaging body 501 still rests on the flat portion of the toner tank 167. Hence, the engaging piece 501b does not protrude from the run 1b of the belt 1. When the collecting tank 236 is mounted before the toner tank 167, the operations of the engaging pieces 500 and 501 will be reversed. Specifically, the engaging piece 501a mates with the notch 236c first. In this condition, the engaging piece 501b protrudes from the run 1a of the belt to prevent process packs other than the toner tank 167 from being mounted.

Eighth Embodiment

Referring to FIGS. 24–26, an eighth embodiment of the present invention is shown which is the combination of the second and third embodiments. In this embodiment, the casings 102 and 103 are each configured such that the distance thereof from the axis of rotation R1 sequentially decreases toward the free end. As shown in FIG. 24, press rollers 301 and 302 are provided in place of the cams 165 and 238. Check rollers 303 and 304 are located at opposite sides of and at an angular distance of 45 degrees from the roller 101. The check rollers 303 and 304 are mounted on the copier body and do not rotate about the axis of rotation R1.

In operation, assume that the casings 102 and 103 and belt 1 are bodily rotated counterclockwise from the position shown in FIG. 24. Then, as shown in FIG. 25, the casing 103 begins to open while being pressed by the press roller 302 to the free end thereof. Although the other casing 102 also tends to open, it is prevented from doing so by the check roller 303. As the rotation proceeds, the casing 103 is released from the check roller 302 and fully opened, as shown in FIG. 26. The other casing 102 remains in the closed position since it meets the check roller 304 after the check roller 303. As the casing 103 moves away from the run 1b of the belt 1, the shutter 240 closes the opening 236a. In the position shown in FIG. 26, the opening 236a is fully closed by the shutter 240. The other shutter 168 remains open since the casing 102 does not move away from the belt 1, as stated earlier. In this manner, the opening 236a of the casing 103 brought into alignment with the opening 25 is closed by the shutter 240, and the process unit received in the casing 103 is pulled out. This, coupled with the fact that the opening 236a faces upward, prevents the toner from leaking to the outside to smear the operator's body or the room. The toner of the casing 102 which does not face the opening 25 surely remains in the casing 102.

As stated above, in the illustrative embodiment, when a particular process unit is to be replaced, it is rotated together with the other process unit to a position different from an image forming position and, therefore, easy to remove. Since a plurality of process units have an identical shape and mounted and dismounted at a fixed position, it is not necessary for the operator to confirm the mounting and dismounting positions of the individual process units. Since the positions where the individual units are expected to occupy are not limited, mounting an unexpected unit or similar occurrence is eliminated. The process means each having a particular life may be constructed into independent units so as to be replaced at particular timings. The process units are each moved away from the belt only at the fixed mounting and dismounting position. This prevents an occurrence that the toner is scattered around out of a unit located at a position other than the mounting and dismounting position.

The first to eighth embodiments of the electrophotographic process unit in accordance with the present invention have been described above with reference to the drawings. Other characteristic features of the present invention which all the embodiments share will be described hereinafter.

In each of the embodiments, when the unit U1 or U2 is mounted again on the copier body, sensors sense the end of rotation of the belt 1 and the mounting of the unit U1 or U2 on the copier body. Then, the cleaning device 23 is operated. FIG. 27 shows a routine for the replacement of the process pack while FIG. 28 shows a routine for homing the process pack to a position where it is ready to function.

In FIG. 27, whether or not a toner end condition is reached is determined (step S1) and, if the answer is positive, the process packs are rotated to bring the unit U1 to the replacing position (S2). Then, a development replace flag is set (S3). If a tone end condition is not reached as determined in the step S1, whether or not more than a predetermined amount of waste toner is collected in the collecting tank 236 is determined (S4). If the answer of the step S4 is positive, the process packs are rotated to move the unit U2 to the replacing position, and then a cleaning replace flag is set (S6). If the answer of the step S1 or S4 is positive, the power source of the process packs are turned off (S7). When none of the toner end condition and toner over condition is reached, the program returns to the step S1.

In FIG. 28, whether or not the cleaning replace flag is set is determined (S10) and, if the answer is positive, whether or not the cleaning device has been replaced is determined (S11). If the cleaning device has not been replaced as determined in the step S11, the program inhibits a copying operation (S12) and then returns. If the answer of the step S11 is positive, the cleaning replace flag is reset (S12), and then the process pack power source is turned on (S13). Subsequently, the process packs are rotated to an operative position (S14). In this position, the belt 1 is cleaned (S15), and then a copying operation is allowed (S16). If the answer of the step S10 is negative, whether or not the development replace flag is set is determined (S17) and, if the answer is positive, whether or not the developing device has been replaced is determined (S18). If the answer of the step S18 is positive, the development replace flag is reset (S19), followed by the step 13. If the answer of the step S18 is negative, the program advances to a step S20 for inhibiting the copier from operating.

Figure 29A:
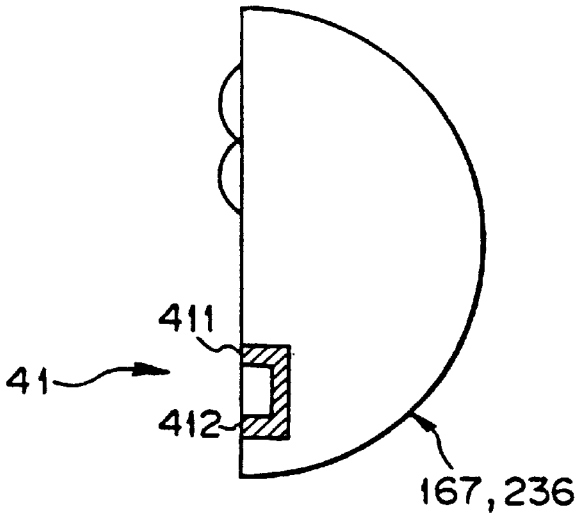
Figure 29B:
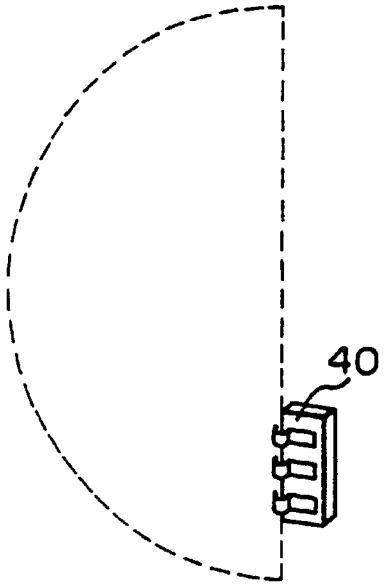
Figure 29C:
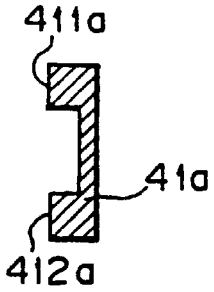
Figure 29D:
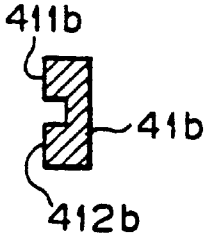
Figure 29E:
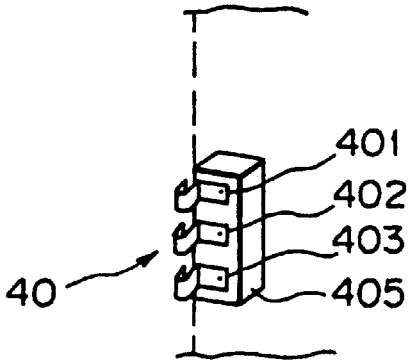

FIGS. 29A–29E show the rear end of a process pack and a conduction sensor provided on the rear panel, not shown, of the copier body. Specifically, FIG. 29A shows the rear end of a process pack while FIG. 29B shows a conduction sensor mounted on the rear panel of the copier body which the process pack is to face. FIGS. 29C and 29D show conduction sensors mounted on the toner tank 167 and collecting tank 236, respectively. FIG. 29E shows the conduction sensor of FIG. 29B more specifically. As shown, a generally U-shaped conductive member 41 is provided on the rear end of the process pack and implemented as a film of aluminum or similar conductive metal. The conductive member 41 has two contact portions 411 and 412 spaced apart from each other by a predetermined distance, and a portion for short-circuiting the contact portions 411 and 412. On the other hand, a sensing section 40 is provided on the copier body to face the conductive member 41. The sensing section 40 has a base 405 made of resin and mounted on the rear panel of the copier body. Three terminals, i.e., a common terminal 401, a developing unit terminal 402 and a cleaning unit terminal 403 are affixed to the base 405. Leads extending from the terminals 401, 402 and 403 terminate at a control device built in the copier body. The contact portions 411 and 412 of the sensing section 41a are spaced apart by the same distance as the common terminal 401 and developing unit terminal 402. A similar conductive member 41b is provided on the collecting tank 286 and has contact portions 412a and 412b. The contact portions 412a and 412b are spaced apart by the same distance as the common terminal 401 and cleaning unit terminal 403. When either of such process packs is mounted on the copier body, the conductive member 41a or 41b thereof contacts the associated terminals of the sensing section 40 mounted on the copier body. At the same time, the conductive film 41a or is urged against the sensing section 40 by biasing means, not shown. Therefore, one contact portion 411a or 411b contacts the common terminal 401 of the sensing section 40 while the other contact portion 412a or 412b contacts either of the remaining terminals 402 or 403 of the sensing section 40. Such a configuration allows the kind of the process pack mounted on the copier body to be determined on the basis of the conduction of the common terminal 401 and either of the developing unit terminal 402 and cleaning unit terminal 403. The output of the conduction sensor is sent to the control device of the copier body which in turn displays the kind of the process pack on the operation and display section of the copier body.

FIGS. 30 and 31 each shows a specific message appearing on the operation and display section. When both of the process packs are removed from the copier body, the outputs of the conduction sensors of the two units U1 and U2 indicate non-conduction. Then, determining that the electrophotographic process unit is empty, the control device displays a message 50 on a screen 50 for urging the operator to insert a process pack, as shown in FIG. 30. When the operator inserts, for example, the collecting tank 236 first, the control device displays another message indicative of the process pack to be mounted next, as shown in FIG. 31. At the same time, the control device shows on a display 51, FIGS. 2 and 14, located in close proximity to the opening 25 that the toner tank 167 should be mounted next. When the toner tank 167 is correctly mounted on the copier body, the control device fixes the process unit, rotates it, and then informs the operator of the ready state of the copier body. If the process pack inserted after the collecting tank 236 is another collecting tank 236, the control device displays a message in response to the resulting output of the conduction sensor (40 and 41), urging the operator to replace it. At the same time, the control device energizes a buzzer, not shown, to produce an alarm tone.

FIGS. 32A and 32B each shows a different process pack having been removed from the copier body. As shown, a handle 65 is provided on the front end plate 304 of each process pack in order to facilitate the mounting and dismounting operations and to prevent the process pack from being inserted in a wrong position. As shown in FIG. 33, the handle 65 may be sized slightly greater than the front end plate 304 and casing 102 or 103. Then, the process pack will have the handle 65 blocked by the front edge of the casing 102 or 103 to be thereby prevented from advancing deeper into the casing 102 or 103. Further, as shown in FIGS. 34A and 34B, the process packs may have their diameter sequentially reduced from the front end toward the rear end, in which case the casings 102 and 103 will be provided with a complementary configuration.

FIG. 35 shows a specific manner in which the process packs removed from the copier body are inserted into a receptacle. As shown, when each process pack is pulled out of the copier body, the entire opening 167a or 236a thereof is completely flat. Hence, the two process packs form a cylinder when combined with the flat portions thereof contacting each other. For this reason, such process packs removed from the copier body or new process packs to be sold in a package may be received in a simple hollow cylindrical receptacle 310, as illustrated. The receptacle 310 accommodates the two process packages without any clearance and contributes a great deal to the reduction of cost due to the simple configuration. If desired, locking means for locking the flat portions of the two process packs to each other may be provided to insure the connection thereof.

As a copier is operated over a long period of time, toner particles and paper dust are apt to deposit on the mechanical arrangemens, resulting in a malfunction or a paper jam. Then, the operation of the copier is interrupted by a protection device. While the opposite runs 1a and 1b of the belt 1 are covered by the casings 102 and 103 of the process packs that hold the belt 1 therebetween, the curved portions of the belt 1 wrapping around the rollers 100 and 101 have to be exposed to define the exposure position and the image transfer position, as stated earlier. When the operator or a jamming sheet, for example, contacts such exposed portions of the belt 1 while the operator is removing the jamming sheet, grease, dust or similar impurity is likely to contaminate or scratch the belt 1. This would produce a reproduction which is not clear-cut due to a stripe pattern or a shadow.

FIGS. 36 and 37 each shows a specific condition wherein a recording sheet has jammed a sheet transport path defined in the copier body. Specifically, FIGS. 36 and 37 respectively show a sheet jamming the path at the image transfer position and a sheet jamming the path at a position other than the same. Photosensors S1, S2 and S3 are arranged on the transport path in close proximity to the pick-up roller 17a of the sheet feed section 17, upstream of the register roller pair 17b, and downstream of the fixing roller pair 22, respectively. The photosensors S1–S3 are each responsive to the leading edge or the trailing edge of a recording sheet. Each of the sensors S1–S3 senses the time when a sheet passes it or travels the path between it and adjoining sensor. The control device compares the sensed time and a reference time and, if the former is not coincident with the latter, produces, for example, a jam signal to interrupt the operator of the copier.

Specifically, as shown in FIG. 36, when a recording sheet jams the image transfer position due to, for example, incomplete separation from the belt 1, the solenoids for rotating the cams 165 and 238 are deenergized and the two units U1 and U2 are not rotated. Then, as the cams 165 and 238 are rotated counterclockwise, the developing tank 167 and collecting tank 236 are rotated counterclockwise about their associated pins 164 and 235 by the action of the springs 159 and 237. As a result, the developing roller 160 and the fur brush 231 and cleaning blade 230 are spaced apart from the belt 1 by a predetermined distance. An image transfer unit T carries the transfer charger 18 and seperation charger 19 thereon and supports the two rollers 28 and 29 around which the transport belt 21 is passed. In parallel with the movement of the units U1 and U2 away from the belt 1, the image transfer unit T is rotated counterclockwise about the axis of the roller 28 to an inoperative position spaced apart from the image transfer position. As a result, a space desirable for the operator to remove the jamming sheet by hand is formed in the vicinity of the image transfer position. This prevents the operator from touching the belt 1 or prevents the jamming sheet from contacting the surface of the belt 1 or being torn off when forcibly pulled by the operator.

Assume that a recording sheet has jammed the transport path at a position other than the image transfer position, as shown in FIG. 37. Then, the image forming operation is interrupted immediately. The solenoids for rotating the cams 165 and 238 are deenergized to allow the developing tank 167 and collecting tank 236 to move away from the belt 1. Further, the two units U1 and U2 are rotated counterclockwise about 90 degrees to move the image transfer position of the belt 1 away from the transport path. In this case, the image transfer unit T is not retracted since the absence of a sheet at the image transfer position is known. In this condition, the operator is prevented from touching the belt 1 while removing the jamming sheet while the jamming sheet is prevented from damaging the belt 1. Rotating the units U1 and U2 counterclockwise as mentioned above is advantageous over rotating them clockwise since the latter might allow the waste toner free from a charge to drop through the opening 236a of the collecting tank 236. Specifically, the counterclockwise rotation brings the developing tank 167 to above the collecting tank 236 and surely confines the toner in the tank 167 since this toner is sufficiently charged. Of course, the rotation angle of the units U1 and U2 is not limited to 90 degrees and may be suitable selected in consideration of the internal layout of the copier, so long as it prevents the operator from touching the belt by accident.

As stated above, the illustrative embodiments allow the operator to pull out a process pack received in either of the developing unit U1 and cleaning unit U2 from the casing C of the copier body and then maintain it or insert a substitute process pack into the casing C without considering the dismounting order or the mounting order of process packs and, moreover, by a single semiautomatic operation. The operator, therefore, can replace the electrophotographic process devices or replace the used toner with a fresh toner simply and rapidly.

In any of the embodiments shown and described, when a new process pack is mounted on the copier body, the copier is automatically operated in a forming mode to cause the process pack to adapt itself to the photoconductive belt.

While the embodiments are implemented with a developing device using a single component type developer, they are similarly practicable with a developing device using a two component or a multiple component type developer. When the toner tank 167 runs out of toner or the collecting tank 236 is full of waste toner, the embodiments cause the toner sensor or tile full sensor 239 to sense it and display such a condition on the operation and display board. If desired, an arrangement may be made such that in response to the output of the sensor either the developing unit U1 or the cleaning unit U2 is automatically unlocked and rotated into alignment with the opening 25. In the second embodiment, each shutter sequentially closes the opening of the associated process pack as the casing moves away from the flat portion of the belt. Alternatively, the shutter may close the opening immediately after the casing has moved away from the belt. The shutter may be constituted by a single member or a plurality of (e.g. two) members, as desired.

In summary, the present invention promotes easy, rapid and sure daily maintenance including the supply of toner and protects an image carrier from damage ascribable to such maintenance. Also, the present invention allows a minimum of deterioration due to aging to occur in the image carrier and electrophotographic process means even when an image forming apparatus accommodating them is left in an inoperative state over a long period of time. Further, the present invention allows the operator to remove a jamming sheet from an image transfer station easily and rapidly and prevents the jamming sheet from being torn off during removal.

Various modifications will become possible for those skilled in the art after receiving the teachings of the present disclosure without departing from the scoe thereof.

What is claimed is:

1. An image forming apparatus comprising:

an image carrier; and a plurality of electrophotographic process means arranged around said image carrier;

at least part of said plurality of electrophotographic process means being constructed into two units each being engageable with said image carrier and rotatable integrally with said image carrier, such that said image carrier and said two units are rotatable together as a unit;

said two units having a substantially identical configuration, and wherein said two units are shaped and positioned such that as said image carrier and said two units rotate together each of said two units are disposed inside of a locus of rotation of said image carrier, and wherein said locus of rotation is defined as a path of radially outermost points of said image carrier as said image carrier and said two units rotate together.

2. An apparatus as claimed in claim 1, wherein one of said units comprises any of said electrophotographic process means whose life is comparatively long, the other of said units comprising any of said process means whose life is comparatively short.

3. An image forming apparatus comprising:

an image carrier; and a plurality of electrophotographic process means;.

at least part of said plurality of electrophotographic process means being constructed into two units each being engageable with said image carrier and rotatable integrally with said image carrier, such that said image carrier and said two units are rotatable together as a unit;

said two units having a substantially identical configuration;

wherein one of said two units comprises any of said electrophotographic process means whose life is comparatively long, the other of said two units comprising any of said process means whose life is comparatively short; and wherein said electrophotographic process means whose life is comparatively long comprises a developing device while said electrophotographic process means whose life is comparatively short comprises a cleaning device.

4. An apparatus as claimed in claim 1, wherein said unit includes a flat portion and said two units are each constructed such that said electrophotographic process means received therein does not protrude from the flat portion included in said unit.

5. An apparatus as claimed in claim 4, further comprising a cylindrical receptacle for storing said two units removed from a body of said apparatus.

6. An image forming apparatus comprising:

an image carrier; and a plurality of electrophotographic process means;

at least part of said plurality of electrophotographic process means being constructed into two units each being engageable with said image carrier and rotatable integrally with said image carrier, such that said image carrier and said two units are rotatable together as a unit;

said two units having a substantially identical configuration;

wherein one of said two units comprises any of said electrophotographic process means whose life is comparatively long, the other of said two units comprising any of said process means whose life is comparatively short; and wherein a body of said apparatus comprises a housing through which an opening is formed, said opening allowing only one of said two units to pass therethrough into or out of said body at a time.

7. An apparatus as claimed in claim 6, wherein said other of said two units comprises said electrophotographic process means whose life is comparatively short and is positioned closest to said opening.

8. An apparatus as claimed in claim 6, wherein said opening is oriented such that said two units are each inserted or pulled out with a portion thereof engageable with said image carrier facing upward.

9. An image forming apparatus comprising:

an image carrier; and a plurality of electrophotographic process means;

at least part of said plurality of electrophotographic process means being constructed into two units each being engageable with said image carrier and rotatable integrally with said image carrier, such that said image carrier and said two units are rotatable together as a unit;

said image carrier being implemented as an endless belt and passed over two rotatable support means such that part of said belt forms two flat portions, said electrophotographic process means of said two units being arranged in such a manner as to face said flat portions of said belt respectively;

said two units each comprising a casing, the outer periphery of said casing forming, when each of said two units is engaged with said image carrier, part of a circumcircle of said image carrier.

10. An apparatus as claimed in claim 9, wherein said electrophotographic process means of said two units which face said flat portions of said image carrier comprise a developing device and cleaning device, respectively.

11. An apparatus as claimed in claim 10, wherein said developing device and said cleaning device are respectively accommodated in said two units and each faces a respective one of said flat portions of said image carrier.

12. An image forming apparatus comprising:

an image carrier;

a plurality of electrophotographic process means;

at least part of said plurality of electrophotographic process means being constructed into two units each being engageable with said image carrier and rotatable integrally with said image carrier, such that said image carrier and said two units are rotatable together as a unit; and discriminating means for determining at least one of:

(1) a kind of each of said two units; and (2) a position of each of said two units.

13. An apparatus as claimed in claim 12, wherein said discriminating means comprises a plurality of conductive contact pieces provided in spaced positions on an outer periphery of each of said two units, and a plurality of conductive terminals mounted on a body of said apparatus for contacting said conductive contact pieces.

14. An apparatus as claimed in claim 12, wherein each of said two units includes a front end plate and wherein said discriminating means comprises a projection extending out from the front end plate of each of said two units and protruding from a front edge of an inlet formed in a mounting portion of a body of said apparatus.

15. An apparatus as claimed in claim 12, wherein said discriminating means comprises a cross-sectional area which decreases from a front portion to a rear portion of each of said two units, a mounting portion of a body of said apparatus including a portion whose cross-sectional area is smaller than the cross-sectional area of said front portions of said two units.

16. An apparatus as claimed in claim 15, wherein said front portion comprises an inlet.

17. An apparatus as claimed in claim 15, wherein said front portion comprises handle means provided on an end face of said front portion.

18. An image forming apparatus comprising:

an image carrier;

a plurality of electrophotographic process means; and at least part of said plurality of electrophotographic process means being constructed into two units each being engageable with said image carrier and rotatable integrally with said image carrier, such that said image carrier and said two units are rotatable together as a unit;

handle means provided on an outer periphery of each said two units to be selectively raised or lowered and, when raised, having support portions thereof lying in a vertical plane containing a center of gravity of said unit.

19. An image forming apparatus comprising:

an image carrier; and a plurality of electrophotographic process means;

at least part of said plurality of electrophotographic process means being constructed into two units each being engageable with said image carrier and rotatable integrally with said image carrier, such that the integral arrangement itself having said image carrier and said two units are bodily rotatable together as a unit about an axis in a body of said image forming apparatus;

wherein said two units comprise respective casings having a substantially identical configuration, said casings each being formed with a notch at a particular position, a body of said apparatus comprising a housing through which an opening capable of passing only one of said casings at a time is formed and an engaging member which mates with said notch when one of said casings is mounted or dismounted.

20. An image forming apparatus comprising:

an image carrier; and a plurality of electrophotographic process means;

at least part of said plurality of electrophotographic process means being constructed into two units each being engageable with said image carrier and rotatable integrally with said image carrier, such that the integral arrangement itself having said image carrier and said two units are bodily rotatable together as a unit about an axis in a body of said image forming apparatus;

the apparatus further comprising display means, and discriminating means for determining a kind of said two units being mounted, said display means displaying a guidance matching the kind of said two units.

21. An apparatus as claimed in claim 20, wherein said discriminating means is mounted on a body of said apparatus and determines the kind of each of said two units when said discriminating means contacts part of each of said two units.

22. An apparatus as claimed in claim 20, wherein said discriminating means comprises transmitting means mounted on each of said two units for transporting a particular signal, and receiving means mounted on a body of said apparatus for receiving said signal from each of said two units.

23. An apparatus as claimed in claim 22, wherein said two units each comprise a switch to be operated when an operator holds a handle provided on each of said two units for inserting said two units into a body of said apparatus, said transmitting means transmitting said signal when said switch is closed.

24. An apparatus as claimed in claim 20, wherein said two units each include a particular color representative of the kind of each of said two units, said display means displaying the kind of each of said two units by using the same respective colors as said two units.

25. An apparatus as claimed in claim 20, wherein when one of said two units is inserted into a body of said apparatus, said display means displays an error when said one of said two units being inserted is of the same kind as another of said two units already mounted on said body as determined by said discriminating means.

26. An apparatus as claimed in claim 20, wherein said display means displays the kind of one of said two units which is not mounted as determined by said discriminating means.

27. An apparatus as claimed in claim 25, wherein said display means is positioned in close proximity to an opening which is formed through said body of said apparatus for inserting and removing said two units.

28. An image forming apparatus comprising:

an image carrier; and a plurality of electrophotographic process means;

at least part of said plurality of electrophotographic process means being constructed into two units each being engageable with said image carrier and rotatable integrally with said image carrier, such that the integral arrangement itself having said image carrier and said two units are bodily rotatable together as a unit about an axis in a body of said image forming apparatus;

the apparatus further comprising detecting means for detecting a paper jam occurring in a transport path, and control means for controlling the operation of said apparatus such that when said detecting means detects a paper jam, said two units are moved away from said image carrier.

29. An apparatus as claimed in claim 28, wherein said control means controls said apparatus such that when said detecting means detects a paper jam occurred at a toner image transfer position, said image carrier is fixed in an image forming position.

30. An apparatus as claimed in claim 28, wherein said control means control said apparatus such that when said detecting means detects a paper jam at a toner image transfer position, image transferring means and devices associated therewith are moved away from said image carrier.

31. An image forming apparatus comprising:

an image carrier; and a plurality of electrophotographic process means;

at least part of said plurality of electrophotographic process means being constructed into two units each being engageable with said image carrier and rotatable integrally with said image carrier, such that the integral arrangement itself having said image carrier and said two units are bodily rotatable together as a unit about an axis in a body of said image forming apparatus;

the apparatus further comprising:

support means for supporting said two units and said image carrier such that said two units and said image carrier are rotatable integrally;

first detecting means for detecting an end of a rotary motion of said two units and said image carrier;

second detecting means for detecting that said two units are mounted on a body of said apparatus; and means for causing, among said plurality of electrophotographic process means, a cleaning device to operate and for rotating said image carrier in response to detection outputs of said first and second detecting means.

32. An image forming apparatus comprising:

an image carrier; and a plurality of electrophotographic process means arranged around said image carrier, at least part of said plurality of electrophotographic process means being constructed into two units each being engageable with said image carrier and rotatable integrally with said image carrier, such that the integral arrangement itself including said image carrier and said two units are bodily rotatable together as a unit about an axis in a body of said image forming apparatus, wherein a closed space is defined within said image carrier, and said axis is located in said closed space;

the apparatus further including first support means for supporting said two units and said image carrier such that said two units and said image carrier are rotatable integrally;

second support means for supporting said two units such that said two units each move into or out of contact with said image carrier in interlocked relation to the rotation of said two units and said image carrier; and said second support means causing said two units to move away from said image carrier only at a position where said two units may be mounted or dismounted.

33. An apparatus as set forth in claim 28, wherein said control means further controls said apparatus such that when said detecting means detects a paper jam on said transport path at a position other than a toner image transfer position, said two units are rotated together with said image carrier to move portions of said image carrier which are exposed away from said transport path.

34. An image forming apparatus comprising:

an image carrier; and a plurality of electrophotographic process means arranged around said image carrier;

at least part of said plurality of electrophotographic process means being constructed into two units each being engageable with said image carrier and rotatable integrally with said image carrier, such that the integral arrangement itself including said image carrier and said two units are bodily rotatable together as a unit about an axis in a body of said image forming apparatus, wherein a closed space is defined within said image carrier, and said axis is located in said closed space, and further wherein said two units comprise a developing unit and a cleaning unit.

35. An image forming apparatus comprising:

an image carrier;

a plurality of electrophotographic process means arranged around said image carrier;

at least part of said plurality of electrophotographic process means being constructed into two units each being engageable with said image carrier and rotatable integrally with said image carrier, such that the integral arrangement itself including said image carrier and said two units are bodily rotatable together as a unit about an axis in a body of said image forming apparatus, wherein each of said two units include a contour which coincides with a locus of rotation of the image carrier, and wherein said locus of rotation is defined as a path of radially outermost points of said image carrier as said image carrier and said two units rotate together.

*36. An image forming apparatus for forming a toner image on an image forming medium, comprising:*

*an outer housing which has an opening; and*

*a plurality of image forming units for forming said toner image on said image forming medium,*

*predetermined image forming units, each having a life which is shorter than that of said apparatus, among said plurality of image forming units being formed as a cylindrically shaped unit which rotates around a center of said cylindrically shaped unit, one of said predetermined image forming units being removed from said image forming apparatus when said predetermined image forming unit faces to said housing.*

*37. An image forming apparatus as claimed in claim 36, wherein said one of said predetermined image forming units comprises a developing unit having a developing roller which is covered when said developing unit faces to said opening.*

*38. An image forming apparatus comprising:*

*a housing;*

*an image carrier in said housing;*

*at least one image developing device rotatable mountable in said housing; and*

*an opening in a wall of said housing, said opening being generally aligned with said developing device when said developing device is mounted in said housing at a predetermined rotational position,*

*wherein said developing device is mounted in said housing such that said developing device may be introduced and removed from said housing through said opening when said developing device is at said predetermined rotational position.*

*39. The image forming apparatus of claim 38 including a generally cylindrical unit mounted for rotation in said housing about a cylinder axis thereof, said generally cylindrical unit having said at least one image developing device, wherein said at least one image developing device is mounted for rotation about the cylinder axis of said unit.*

*40. The image forming apparatus of claim 38 wherein said opening has a size and shape which is substantially the same as a size and shape of said developing device.*

*41. The image forming apparatus of claim 39 wherein said opening has a size and shape which is substantially the same as a size and shape of said developing device.*

*42. The image forming apparatus of claim 38 including discriminating means for discriminating an identifying characteristic of said image developing device.*

*43. The image forming apparatus of claim 38 including at least one image processing device which is outside a locus of revolution of said image developing device.*

*44. The image forming apparatus of claim 38 wherein said housing includes an element which mates with the developing device only when the developing device is correctly mounted in said housing.*

*45. The image forming apparatus of claim 38 including means for displaying that the developing device is empty.*

*46. The image forming apparatus of claim 38, wherein said developing device cooperates with said image carrier to develop an image on said image carrier when said developing device is in a developing position which is different from said predetermined rotational position.*

*47. The image forming apparatus of claim 38 including means for shutting off electrical power to said developing device when said developing device is at said predetermined position.*

*48. The image forming apparatus of claim 38 wherein said image developing device includes a developing roller which cooperates with said image carrier to develop an image on said image carrier.*

*49. The image forming apparatus of claim 39 wherein said image developing device includes a developing roller which cooperates with said image carrier to develop an image on said image carrier.*

*50. The image forming apparatus of claim 48 wherein said developing device includes an opening through which said developing roller is exposed so as to cooperate with said image carrier, further including a shutter which selectively closes said opening.*

*51. The image forming apparatus of claim 49 wherein said developing device includes an opening through which said developing roller is exposed so as to cooperate with said image carrier, further including a shutter which selectively closes said opening.*

* * * * *